United States Patent
Hsu et al.

(10) Patent No.: US 9,557,527 B2
(45) Date of Patent: Jan. 31, 2017

(54) OPTICAL IMAGING LENS AND ELECTRONIC DEVICE INCLUDING THE LENS

(71) Applicant: Genius Electronic Optical Co., Ltd., Taichung (TW)

(72) Inventors: Sheng-Wei Hsu, Taichung (TW); Chih-Yang Yeh, Taichung (TW)

(73) Assignee: Genius Electronic Optical, Co., Ltd., Taichung (TW)

( * ) Notice: Subject to any disclaimer, the term of this patent is extended or adjusted under 35 U.S.C. 154(b) by 538 days.

(21) Appl. No.: 14/050,291

(22) Filed: Oct. 9, 2013

(65) Prior Publication Data

US 2015/0098010 A1  Apr. 9, 2015

(51) Int. Cl.
G02B 13/00 (2006.01)
G02B 13/18 (2006.01)

(52) U.S. Cl.
CPC .................. *G02B 13/0045* (2013.01)

(58) Field of Classification Search
CPC .................................................. G02B 13/0045
USPC ........................................................ 359/714
See application file for complete search history.

(56) References Cited

U.S. PATENT DOCUMENTS

| | | | |
|---|---|---|---|
| 2,445,594 A | 7/1948 | Bennett | |
| 3,936,153 A | 2/1976 | Ogura | |
| 4,674,844 A | 6/1987 | Nishioka et al. | |
| 6,650,486 B2 | 11/2003 | Chen | |
| 6,940,661 B2 | 9/2005 | Chen | |
| 7,826,151 B2 | 11/2010 | Tsai | |
| 7,864,454 B1 | 1/2011 | Tang et al. | |
| 7,911,711 B1 | 3/2011 | Tang | |
| 8,000,031 B1 | 8/2011 | Tsai | |
| 8,072,695 B1 | 12/2011 | Lee et al. | |
| 8,179,613 B2 | 5/2012 | Sano | |

(Continued)

FOREIGN PATENT DOCUMENTS

| | | |
|---|---|---|
| CN | 102566016 A | 7/2012 |
| JP | 2009-294527 A | 12/2009 |

(Continued)

OTHER PUBLICATIONS

Office Action for Japanese Patent Application No. 2014-203079, mailed on Aug. 18, 2015, 3 pages.

(Continued)

*Primary Examiner* — Scott J Sugarman
(74) *Attorney, Agent, or Firm* — Kilpatrick Townsend and Stockton LLP

(57) ABSTRACT

An imaging optical lens includes, in order from object side to image side, an aperture stop, first, second, third, fourth, and fifth lens elements, each of the five lens elements having an object side surface and an image side surface. The object side surface of the first lens element is convex along an optical axis. The image-side surface of the second lens element concave in the vicinity of an outer circumference. The object side of the fourth lens element is convex in the vicinity of the outer circumference. The image side surface of the fifth lens element is concave in the vicinity of the optical axis and convex in the vicinity of the outer circumference. The first, second, third, fourth, and fifth lens elements have a refractive power. The thicknesses of the first, second, third, fourth, and fifth lens elements and the air gaps between them satisfy specific conditions.

19 Claims, 15 Drawing Sheets

(56) References Cited

U.S. PATENT DOCUMENTS

| | | |
|---|---|---|
| 8,189,273 B2 | 5/2012 | Noda |
| 8,233,224 B2 | 7/2012 | Chen |
| 8,310,768 B2 | 11/2012 | Lin et al. |
| 8,325,429 B2 | 12/2012 | Tang |
| 8,400,716 B2 | 3/2013 | Jeong |
| 2004/0240080 A1 | 12/2004 | Matsui et al. |
| 2007/0229984 A1 | 10/2007 | Shinohara |
| 2007/0236811 A1 | 10/2007 | Mori |
| 2012/0092544 A1 | 4/2012 | Noda |
| 2012/0147482 A1 | 6/2012 | Tsai |
| 2012/0262806 A1 | 10/2012 | Huang |
| 2013/0002920 A1 | 1/2013 | Sano |
| 2013/0016278 A1* | 1/2013 | Matsusaka ............. G02B 13/18 348/360 |
| 2013/0038947 A1 | 2/2013 | Tsai |
| 2013/0100542 A1 | 4/2013 | Tsai |
| 2013/0114151 A1 | 5/2013 | Chen et al. |

FOREIGN PATENT DOCUMENTS

| | | |
|---|---|---|
| JP | 2010152042 A | 7/2010 |
| JP | 2010237407 A | 10/2010 |
| JP | 2010262269 A | 11/2010 |
| JP | 2010282000 A | 12/2010 |
| JP | 2012008164 A | 1/2012 |
| JP | 2012189893 A | 10/2012 |
| TW | 201227044 A | 7/2012 |
| WO | 2010024198 A1 | 3/2010 |
| WO | 2012164877 A1 | 2/2012 |
| WO | WO2013/065972 A1 | 5/2013 |

OTHER PUBLICATIONS

Office Action for Chinese Patent Application No. 201410115284.9, mailed on Dec. 21, 2015, 7 pages.

Office Action for Chinese Patent Application No. 201410115284.9 mailed on May 18, 2016, 6 pages.

\* cited by examiner

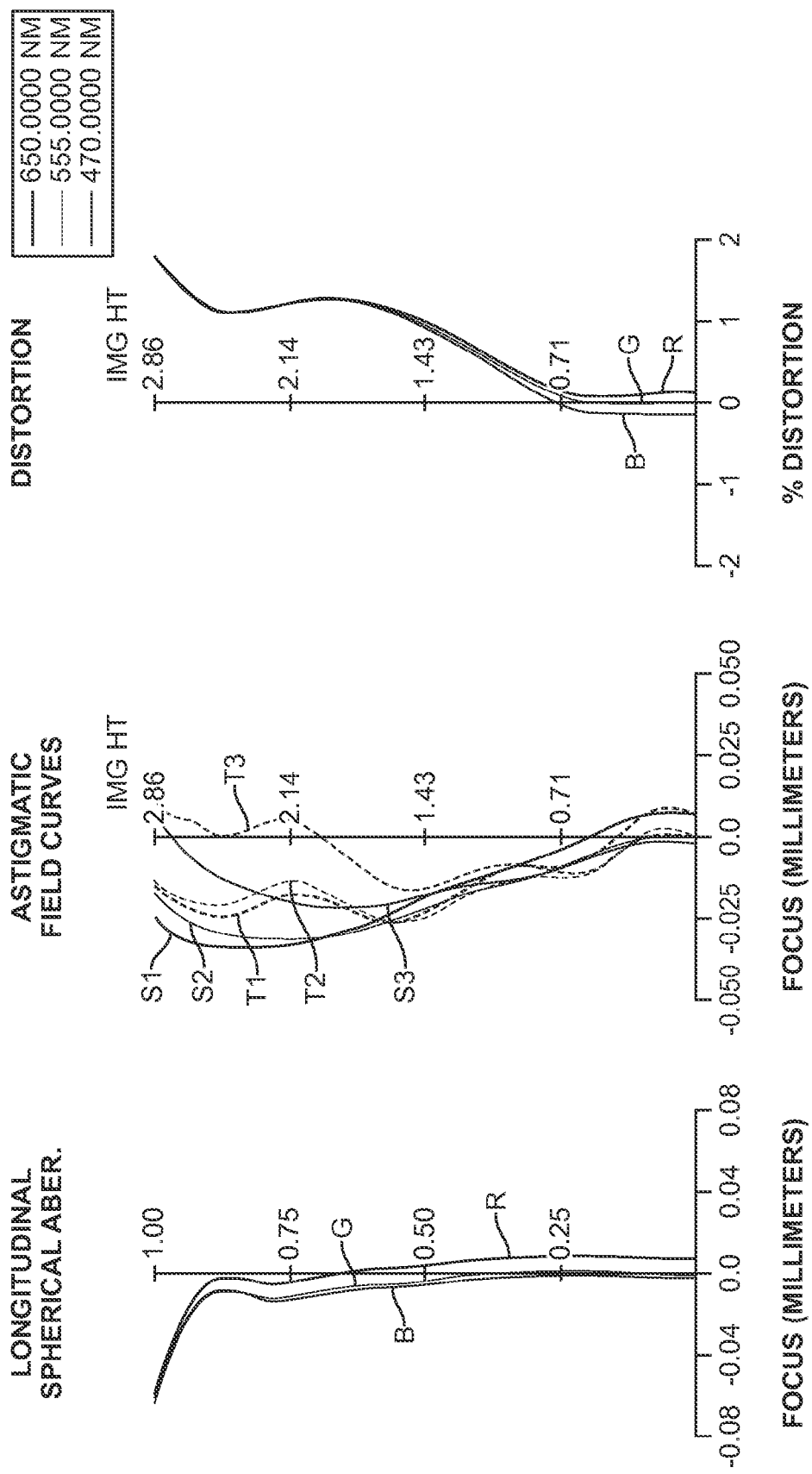

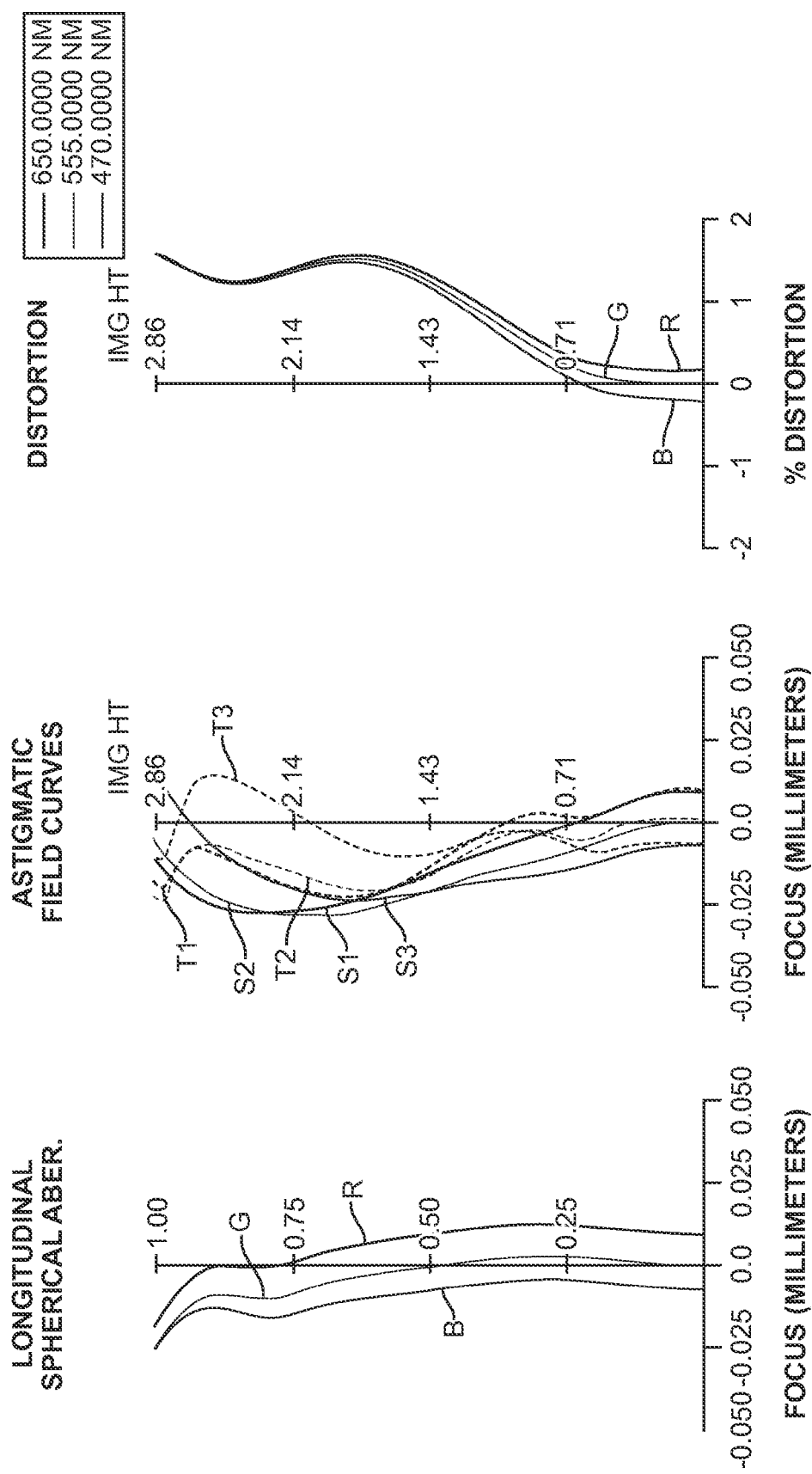

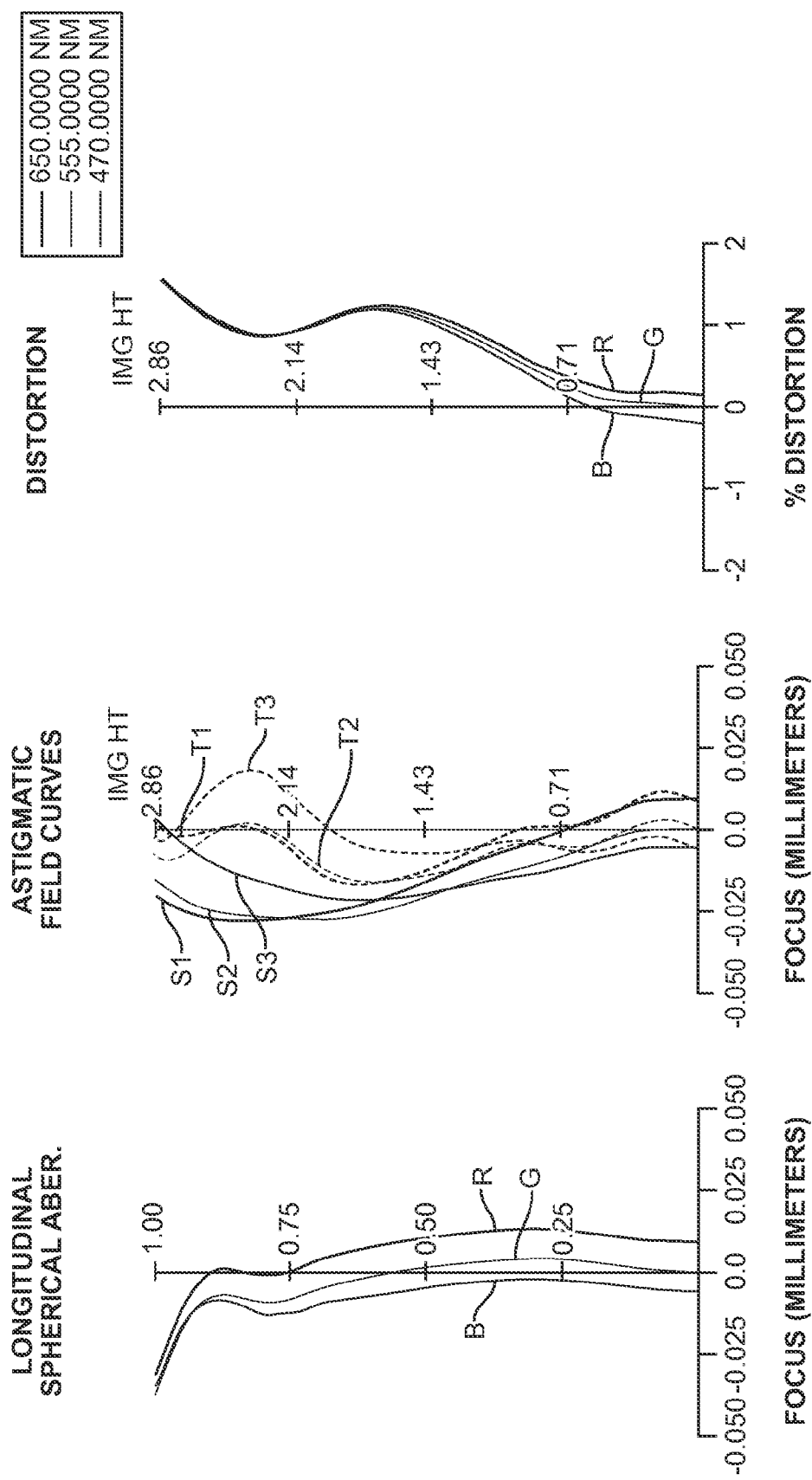

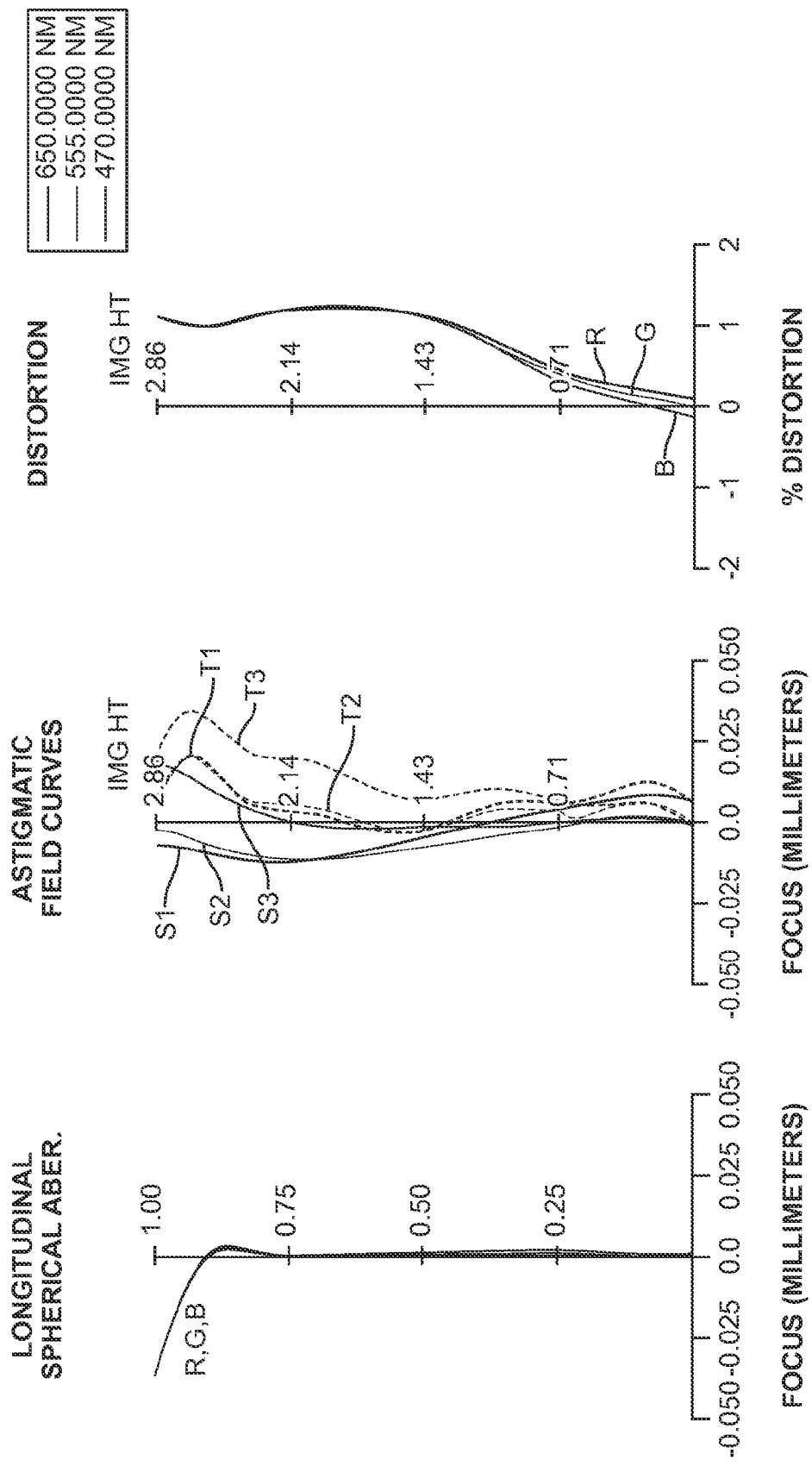

OPTICAL IMAGING LENS AND ELECTRONIC DEVICE INCLUDING THE LENS

CROSS-REFERENCES TO RELATED APPLICATIONS

NOT APPLICABLE

BACKGROUND OF THE INVENTION

The present invention relates to a mobile device and an optical imaging lens thereof, and more particularly to an optical imaging lens having five lens elements and a mobile device incorporated the same.

The current trend in mobile phones with integrated digital cameras for capturing a digital image has become ever more popular. The miniaturization of portable and wearable devices has led to a more compact and lightweight camera lens system. As technology of charge coupled devices (CCD) and complementary metal-oxide semiconductor (CMOS) image sensors advances, there is a requirement for the optical lens systems to improve their optical performance while reducing their length.

As consumer demands for better image quality, conventional miniaturized lens systems having four lens elements cannot satisfy the requirements of higher resolution optical lens systems.

U.S. Patent Publication No. 2007/0236811, 2007/0229984 and Japanese Patent Publication No. 4847172 disclose an optical imaging lens having five lens elements, in which the distance between the object side surface of the first lens element and the image plane is relatively large, and is thus not favorably designed in mobile phones.

The present invention provides several optical imaging lens systems each having five lens elements and portable electronic devices incorporated the optical imaging lens systems to solve the above described problems.

DEFINITION OF TERMS

The expression "a lens element with a positive refractive power for negative refractive power)" refers to the refractive power in the vicinity of the optical axis of the lens element having a positive refractive power for negative refractive power). A object side (or image side) surface of a lens element is convex (or concave) in a region refers to that region having a convex (or concave) surface with respect to the adjacent outer region in the radial direction of that region, and the region is protruding or depressing with respect to the direction of the optical axis.

FIG. 13 provides an example cross-sectional view of a lens element to explain the terms that are used in the present invention. As shown in FIG. 13, "I" denotes the optical axis of an exemplary lens element having rotational symmetry along the optical axis. The object side of the lens element has a convex surface in region A, a concave surface in region B, and a convex surface in region C. Region A has a convex surface because the surface of the region A is protruding in the direction of the optical axis with respect to the adjacent radial outer region (i.e., region B). Region B is depressed in relation to adjacent region C. Region C is protruding with respect to adjacent region E. The expression "area around the circumference" refers to imaging light rays passing through the area in the vicinity of the circumferential area of the lens element, i.e., the region C. The imaging light rays may include a chief ray Lc and marginal rays Lm. The expression "area in the vicinity of the optical axis" refers to imaging light passing through the region of the optical axis, i.e., the region A. The expression "area in a vicinity of an outer circumference of a lens element" means in the vicinity of the circumference region on the surface of the lens element only where the imaging light passes, such as the region C or D. In addition, the lens element may include an extension portion E configured to mount the lens element to a lens barrel. The desired imaging light rays may pass the extended portion E. Although the extension portion E of the lens element may be part of the optical imaging lens, a description and a sketch thereof will be omitted for the sake of brevity.

BRIEF SUMMARY OF THE INVENTION

Embodiments of the present invention provide an imaging optical lens having only five lens elements. The imaging optical lens includes, in order from the object side to the image side, an aperture stop, first, second, third, fourth, and fifth lens elements, each of the five lens elements having an object side surface and an image side surface. The object side surface of the first lens element is convex along an optical axis. The image-side surface of the second lens element concave in the vicinity of an outer circumference. The object side of the fourth lens element is convex in the vicinity of the outer circumference. The image side surface of the fifth lens element is concave in the vicinity of the optical axis and convex in the vicinity of the outer circumference. The first, second, third, fourth, and fifth lens elements have a refractive power and a thickness. The surfaces of the five lens element are aspheric. The thickness of the five lens elements and the air gaps between them satisfy specific conditions.

Embodiments of the present invention also provide a portable electronic device with a built-in digital camera. The portable electronic device includes case, a module housing unit disposed within the case, a lens barrel mounted in the module housing unit, and an optical lens module assembled in the lens barrel. The optical lens module may include, in order from the object side to the image side, an aperture stop, first, second, third, fourth, and fifth lens elements, each of the five lens elements having an object side surface and an image side surface. The object side surface of the first lens element is convex along an optical axis. The image side surface of the second lens element is concave in the vicinity of an outer circumference. The object side of the fourth lens element is convex in the vicinity of the outer circumference. The image side surface of the fifth lens element is concave in the vicinity of the optical axis and convex in the vicinity of the outer circumference.

In an embodiment, the lens barrel is movable lengthwise in the direction of the optical axis.

BRIEF DESCRIPTION OF THE DRAWINGS

The features of the present invention will be described with exemplary embodiments and accompanying drawings, in which:

FIGS. 7A, 7B, and 7C show the respective longitudinal spherical aberration, sagittal and tangential astigmatic aberration, and distortion of the first embodiment.

FIGS. 9A, 9B, and 9C show the respective longitudinal spherical aberration, sagittal and tangential astigmatic aberration, and distortion of the third embodiment.

FIGS. 11A, 11B, and 11C show the respective longitudinal spherical aberration, sagittal and tangential astigmatic aberration, and distortion of the fifth embodiment.

FIGS. 12A, 12B, and 12C show the respective longitudinal spherical aberration, sagittal and tangential astigmatic aberration, and distortion of the sixth embodiment.

DETAILED DESCRIPTION OF THE INVENTION

Embodiments of the present invention provide a five-element optical lens system that has broad applications in portable and wearable electronic devices, such as a mobile phone, a digital still camera, a digital video camera, a tablet, and the like that use a CCD or a CMOS imaging sensor.

Figure 1:
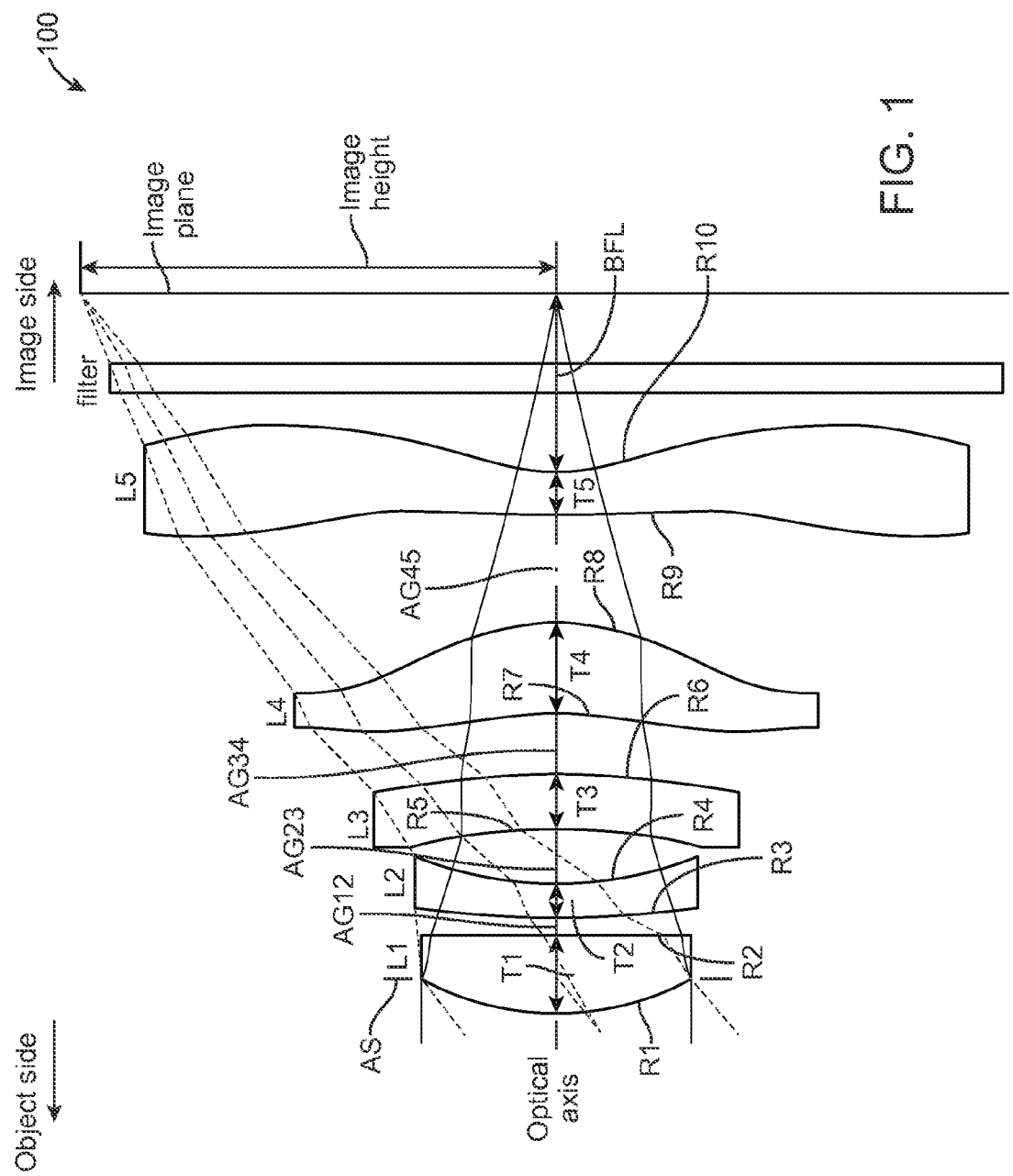
FIG. 1 is a schematic cross-section view of a five-element optical lens system according to a first embodiment of the present invention.

FIG. 1 is a schematic cross-section view of a five-element optical lens system 100 according to a first embodiment of the present invention. Optical lens system 100 includes an optical aperture stop AS, a first lens element L1, a second lens element L2, a third lens element L3, a fourth lens element L4, and a fifth lens element L5 in this order from the object side to the image side along the optical axis.

First lens element L1 has a positive refractive power, a convex object side surface which is convex in the vicinity of the optical axis, and a convex image side surface on the image side along the optical axis. Second lens element L2 has a negative refractive power, a convex object side surface on the object side along the optical axis, a concave image side surface which is concave in the vicinity of the outer circumferential region on the image side. Third lens element L3 has a positive refractive power, a convex surface on the object side surface and a concave surface in the vicinity of the outer circumferential region on the object side, and a convex surface on the image side along the optical axis. Fourth lens element L4 has a positive refractive power, a concave surface on the object side surface in the vicinity of the optical axis and a convex surface in the vicinity of the circumferential region on the object side surface, and a convex surface on the image side along the optical axis. Fifth lens element L5 has a negative refractive power, a convex surface on the object side in the vicinity of the optical axis, a convex surface in the vicinity of the outer circumferential region on the object side and a concave surface between the convex surface on the object side in the vicinity of the optical axis and the convex surface in the vicinity of the outer circumferential region. The image side of the fifth lens element L5 has a concave surface in the vicinity of the optical axis and a convex surface in the vicinity of the outer circumferential region on the image side. The object-side and image side surfaces of the five lens elements are aspheric. R1 and R2 are the respective object side and image side surface of lens element L1. Likewise, R3 and R4 are the respective object side and image side surface of lens element L2. Similarly, R5 and R6 are the respective object side and image side surface of lens element L3. R7 and R8 are the respective object side and image side surface of lens element L4. R9 and R10 are the respective object side and image side surface of lens element L5.

Optical lens system 100 also includes an IR cut filter disposed between the fifth lens element and an image plane and configured to filter out infrared rays in incident light according to an embodiment of the present invention.

In FIGS. 1 to 6, T1 is the thickness of the first lens element L1, T2 is the thickness of the second lens element L2, T3 is the thickness of the third lens element L3, T4 is the thickness of the fourth lens element L4, and T5 is the thickness of the fifth lens element L5. Throughout the specification, AG12 is the air gap between the first and second lens elements, AG23 is the air gap between the second and third lens elements, AG34 is the air gap between the third and fourth lens elements, and AG45 is the air gap between the fourth and fifth lens elements. BFL denotes the back focal length, which is the distance between the image side of the fifth lens element and the image plane along the optical axis.

In the following sections, ALT denotes the total thickness of the first to fifth lens elements. AAG denotes the total width of the air gaps of the first to fifth lens elements along the optical axis. EFL denotes the effective focal length. TL is the distance from the object side surface of the first lens element to the image side surface of the fifth lens along the optical axis.

According to embodiments of the present invention, in order to reduce the total length of the optical lens system, the following measures will be taken: reducing the thickness of the lens elements and the air gaps between them. However, it is difficult to reduce the total thickness of the lens elements while maintaining adequate optical performance. Accordingly, the first lens element is designed to have a positive refractive power, the second lens element is designed to have a negative power, and the fourth lens element has a positive refractive power.

According to embodiments of the present invention, to achieve a compact optical lens system with good optical performance, the following conditions must be satisfied:

$$AAG/AG34 \leq 16.0; \tag{1}$$

$$0.65 \leq AG34/T2; \tag{2}$$

$$1.50 \leq (AG34+AG45)/T2; \tag{3}$$

$$4.00 \leq (T4+T5)/T2; \quad (4)$$

$$1.80 \leq T5/T2; \quad (5)$$

$$2.60 \leq (AG45+T5)/T2; \quad (6)$$

$$1.00 \leq AG45/T2; \quad (7)$$

$$EFL/(AG45+T5) \leq 5.20; \quad (8)$$

$$10.0 \leq (TL+T5)/AG45 \leq 22.0; \quad (9)$$

$$EFL/(AG34+T5) \leq 6.80 \quad (10)$$

$$1.20 \leq (AG34+AG45)/(AG12+AG23). \quad (11)$$

Table 1A shows numeric lens data of optical lens system 100 according to the first embodiment of the present invention. In Table 1A and all following Tables 2A, 3A, 4A, 5A, and 6A, surface #1 is the object, surface #2 means the aperture stop and the thickness is the distance of the aperture stop relative to the object side surface of the first lens element along the optical axis, the negative value means the aperture stop is positioned before the first lens element, surface #3 means the object side of L1 and the thickness is the thickness of the first lens element along the optical axis, surface #4 means the image side surface of L1 and the thickness is the air gap between the first and second lens elements along the optical axis, surface #5 means the object side surface of L2 and the thickness is the thickness of the second lens element, surface #6 means the image side surface of L2 and the thickness is the air gap between the second and third lens elements, surface #7 means the object side surface of L3 and the thickness is the thickness of the third lens element along the optical axis, surface #8 means the image side surface of L3 and the thickness is the air gap between the third and fourth lens elements, surface #9 means the object side surface of L4 and the thickness is the thickness of the fourth lens element, surface #10 means the image side surface of L4 and the thickness is the air gap between the fourth and fifth lens elements, and surface #11 means the object side surface of L5 and the thickness is the thickness of the fifth lens element, surface #12 means the image side surface of L5 and the thickness is the air gap between the fifth lens element and the IR filter. Surface #13 means the object side surface of IR-filter and the thickness is the thickness of the IR cut filter. Surface #14 means the image side surface of IR-filter and the thickness is the air gap between the filter and the image plane. Surface #15 means the image plane.

TABLE 1A

| Surface # | | Curvature Radius | Thickness | Refractive index | Abbe # | Material | Focal length |
|---|---|---|---|---|---|---|---|
| 1 | Object | Infinity | 600 | | | | |
| 2 | Aperture Stop | Infinity | −0.231 | | | | |
| 3 | Lens 1 | 1.566 | 0.535 | 1.546 | 56.114 | plastic | 2.590 |
| 4 | | −12.776 | 0.122 | | | | |
| 5 | Lens 2 | 11.219 | 0.220 | 1.645 | 23.265 | plastic | −3.672 |
| 6 | | 1.939 | 0.341 | | | | |
| 7 | Lens 3 | 25.817 | 0.295 | 1.645 | 23.265 | plastic | 27.519 |
| 8 | | −56.438 | 0.449 | | | | |
| 9 | Lens 4 | −2.704 | 0.641 | 1.546 | 56.114 | plastic | 3.226 |
| 10 | | −1.156 | 0.305 | | | | |
| 11 | Lens 5 | 2.613 | 0.517 | 1.536 | 56.273 | plastic | −3.221 |
| 12 | | 0.968 | 0.523 | | | | |
| 13 | IR-filter | Infinity | 0.210 | | | | |
| 14 | | Infinity | 0.478 | | | | |
| | Image plane | Infinity | | | | | |

In the first embodiment, the effective focal length (EFL) of optical lens system 100 is 1.211 mm. The total length of the optical lens system measured from the object-side surface of lens element L1 to the image plane is 4.636 mm. The image height is 2.856 mm.

Figure 14:
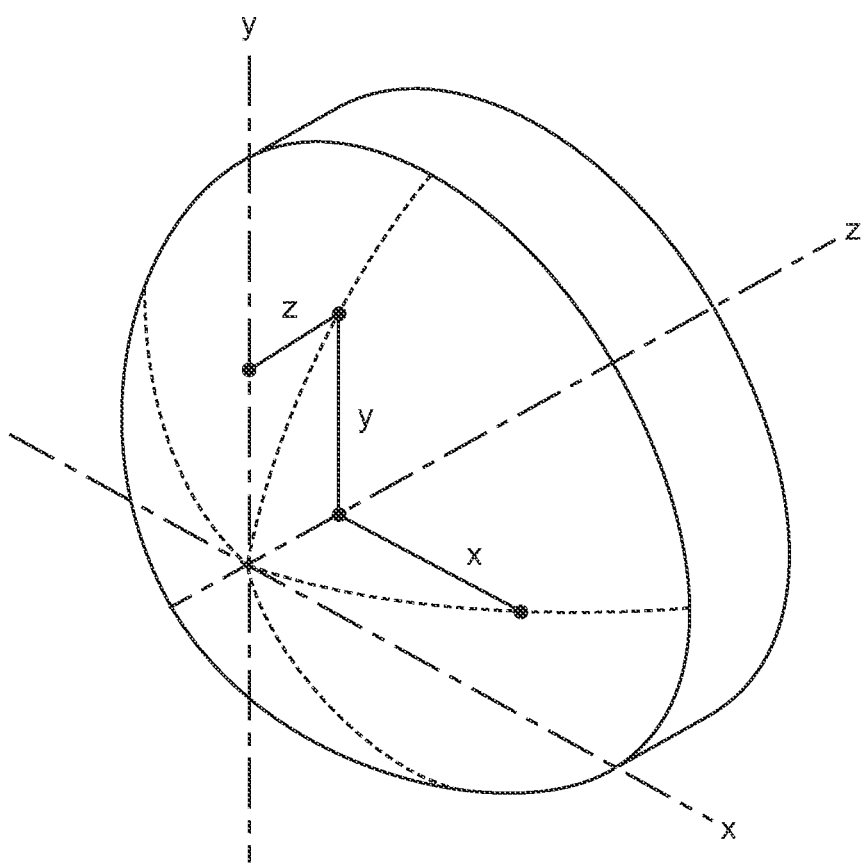
FIG. 14 is a schematic perspective view of an exemplary lens element illustrating some parameters of an equation of the present invention.

The aspheric surfaces (surface #3-surface #12) of the lens elements can be expressed using the following expression:

$$z = \frac{cr^2}{1+\sqrt{1-(1+K)c^2r^2}} + u^4 \sum_{m=0}^{13} a_m Q_m^{con}(u^2)$$

where z is the depth of the aspheric surface of the lens element (the height of a point on the aspheric surface at a distance y from the optical axis relative to the tangential plane at the aspheric surface vertex, and y is the perpendicular distance between the point of the aspherical surface and the optical axis), c is the vertex curvature, $r=\sqrt{x^2+y^2}$ is the radial distance in millimeters (mm) from the optical axis to the lens surface, $u=r/r_n$ with $r_n$ is the normalization radius, K is a conic constant, $Q_m^{con}$ is the $m^{th} Q^{con}$ polynomial, $a_m$ is an aspheric surface coefficient of m-th level (or order term), and x, y, z are shown in FIG. 14 with z being the optical axis.

Table 1B shows numeric values of the five aspheric lens elements of the first embodiment, where NRADIUS is the normalization radius $r_n$.

TABLE 1B

| Surface # | 3 | 4 | 5 | 6 | 7 |
|---|---|---|---|---|---|
| NRADIUS | 0.914404816 | 0.93544527 | 0.938814505 | 0.921074585 | 0.912509898 |
| K | −4.283E+00 | 0.000E+00 | 0.000E+00 | −7.820E+00 | 0.000E+00 |
| a0 | 7.632E−02 | 9.959E−03 | 6.139E−03 | 6.952E−02 | −1.062E−01 |
| a1 | −5.033E−03 | −1.006E−02 | −9.691E−04 | 6.399E−03 | 6.259E−04 |
| a2 | −7.578E−04 | −1.607E−03 | −2.455E−04 | 1.082E−03 | 1.028E−03 |
| a3 | −3.451E−04 | −2.941E−04 | 4.990E−04 | 4.826E−04 | −5.265E−05 |
| a4 | −6.898E−05 | | 1.131E−04 | 9.988E−05 | 0.000E+00 |
| a5 | | | | | |
| a6 | | | | | |

| Surface # | 8 | 9 | 10 | 11 | 12 |
|---|---|---|---|---|---|
| NRADIUS | 1.083959734 | 1.549890262 | 1.672721183 | 2.391848211 | 2.553831604 |
| K | 0.000E+00 | −5.702E+00 | −7.962E−01 | −3.851E+01 | −5.314E+00 |
| a0 | −9.522E−02 | 2.254E−01 | 8.329E−01 | −6.033E−01 | −1.188E+00 |
| a1 | 6.550E−03 | −2.806E−03 | 2.823E−02 | 2.822E−01 | 1.768E−01 |
| a2 | 2.868E−03 | −1.012E−02 | −2.335E−02 | −6.651E−02 | −1.517E−02 |
| a3 | | −1.252E−03 | −6.226E−03 | 1.128E−02 | 2.303E−02 |
| a4 | | 1.168E−03 | 3.113E−03 | −3.936E−03 | −5.717E−03 |
| a5 | | | 1.048E−03 | 2.067E−03 | 9.031E−05 |
| a6 | | | −5.274E−04 | −5.476E−04 | −9.981E−04 |
| a7 | | | | | |

FIGS. 7A, 7B, and 7C show the respective longitudinal aberration, sagittal and tangential aberration, and distortion of the first embodiment. As shown in FIG. 6A, the longitudinal spherical aberration curves for the 470 nm (denoted as "G"), 555 nm (denoted as "B") and 650 nm (denoted as "R") wavelengths are within ±0.025 mm of the image point. The sagittal (denoted as "s1," "s2," "s3") and tangential (denoted as "t1," "t2," "t3") astigmatic aberration for the respective three wavelengths R, G, and B are within ±0.03 mm (as shown in FIG. 7B). The distortion for the three wavelengths (denoted as "G," "B," and "R") is within ±2.5%.

Figure 2:
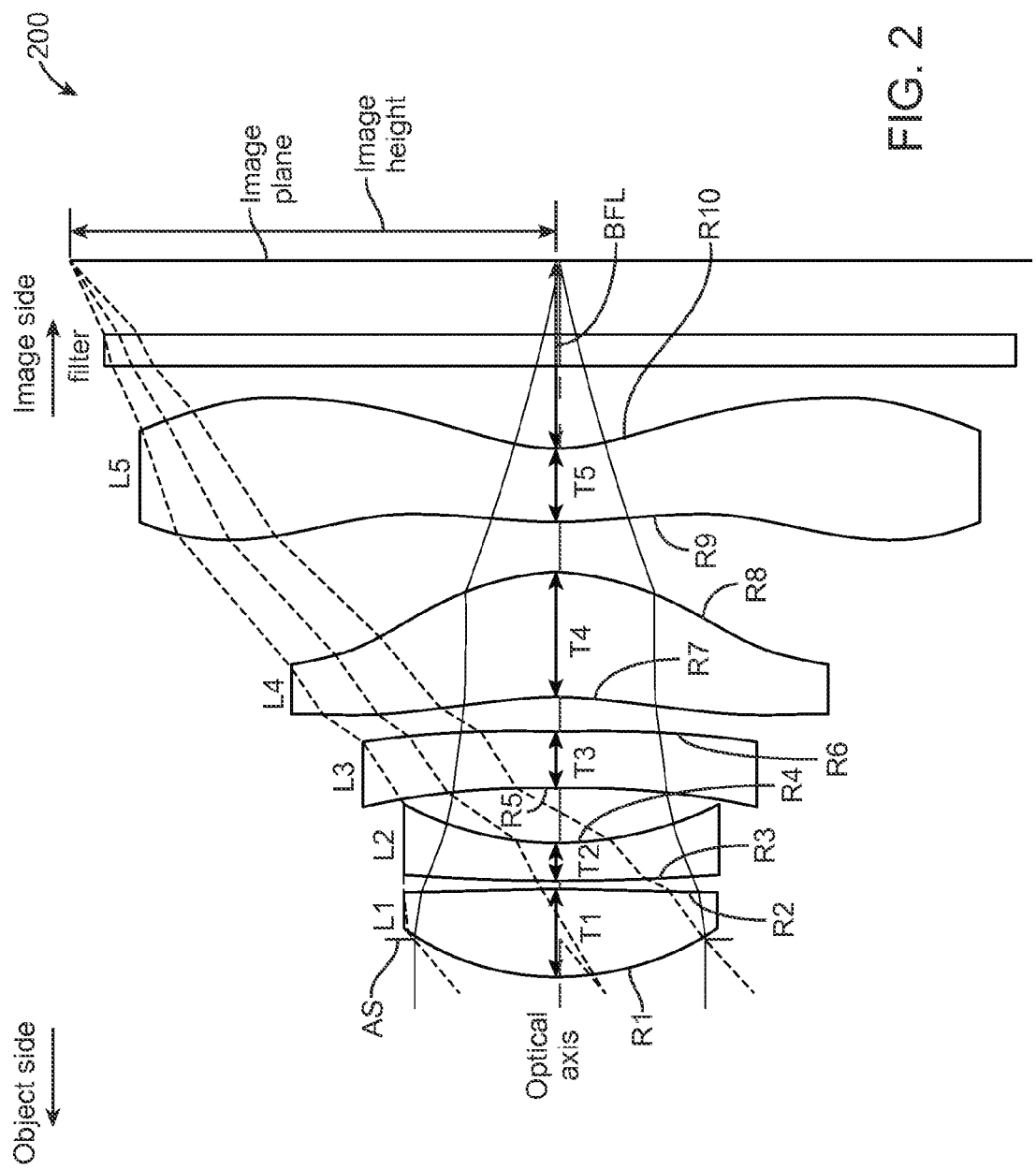
FIG. 2 is a schematic cross-section view of a five-element optical lens system according to a second embodiment of the present invention.

FIG. 2 is a schematic cross-section view of a five-element optical lens system 200 according to a second embodiment of the present invention. Optical lens system 200 has a similar structure as that of optical lens system 100 with the differences in the refractive index of the lens elements, the curvature radius, lens thickness, the air gap width between the lenses, aspheric coefficients, the focal length and other relevant parameters. The difference is that optical lens system 200 comprises third lens element L3 that has a concave surface in the vicinity of the optical axis and a convex surface in the vicinity of the outer circumferential region on the image side.

Table 2A shows numeric lens data of optical lens system 200 according to the second embodiment of the present invention.

TABLE 2A

| Surface # | | Curvature Radius | Thickness | Index | Abbe # | Material | Focal length |
|---|---|---|---|---|---|---|---|
| 1 | Object | Infinity | 600 | | | | |
| 2 | Aperture Stop | Infinity | −0.233 | | | | |
| 3 | Lens 1 | 1.551 | 0.563 | 1.546 | 56.114 | plastic | 2.6254873 |
| 4 | | −16.503 | 0.050 | | | | |
| 5 | Lens 2 | 8.461 | 0.240 | 1.645 | 23.265 | plastic | −4.051267 |
| 6 | | 1.973 | 0.350 | | | | |
| 7 | Lens 3 | 8.519 | 0.353 | 1.645 | 23.265 | plastic | 26.682813 |
| 8 | | 16.605 | 0.236 | | | | |
| 9 | Lens 4 | −2.496 | 0.795 | 1.546 | 56.114 | plastic | 3.1133857 |
| 10 | | −1.125 | 0.332 | | | | |
| 11 | Lens 5 | 2.555 | 0.467 | 1.536 | 56.273 | plastic | −3.290896 |
| 12 | | 0.977 | 0.523 | | | | |
| 13 | IR-filter | Infinity | 0.210 | | | | |
| 14 | | Infinity | 0.479 | | | | |
| | Image plane | Infinity | | | | | |

Table 2B shows numeric values of the five aspheric lens elements of the second embodiment.

TABLE 2B

| Surface # | 3 | 4 | 5 | 6 | 7 |
|---|---|---|---|---|---|
| NRADIUS | 0.89571535 | 0.92218327 | 0.92360555 | 0.91080916 | 0.93974526 |
| K | −4.19E+00 | 0.00E+00 | 0.00E+00 | −7.97E+00 | 0.00E+00 |
| a0 | 7.20E−02 | 8.80E−03 | 5.86E−03 | 6.48E−02 | −1.28E−01 |

TABLE 2B-continued

| | | | | | |
|---|---|---|---|---|---|
| a1 | −4.15E−03 | −1.14E−02 | −2.70E−03 | 6.96E−03 | 3.15E−04 |
| a2 | −5.14E−04 | −2.05E−03 | −1.34E−03 | 5.83E−04 | 2.04E−03 |
| a3 | −2.73E−04 | 1.43E−04 | 8.24E−04 | 5.80E−04 | 2.13E−04 |
| a4 | −3.44E−05 | | 6.31E−05 | 6.50E−05 | |
| a5 | | | | | |
| a6 | | | | | |

| Surface # | 8 | 9 | 10 | 11 | 12 |
|---|---|---|---|---|---|
| NRADIUS | 1.15354365 | 1.38864688 | 1.5734635 | 2.24674792 | 2.4612901 |
| K | 0.00E+00 | −7.97E+00 | −7.89E−01 | −3.85E+01 | −5.16E+00 |
| a0 | −9.57E−02 | 1.66E−01 | 6.37E−01 | −5.87E−01 | −9.99E−01 |
| a1 | 1.07E−02 | 5.74E−03 | 3.49E−02 | 2.37E−01 | 1.56E−01 |
| a2 | 5.40E−03 | −9.02E−03 | −1.60E−02 | −4.31E−02 | −2.10E−02 |
| a3 | | −8.11E−06 | −7.00E−03 | 3.84E−03 | 1.83E−02 |
| a4 | | 6.95E−04 | 1.49E−03 | −2.30E−03 | −3.94E−03 |
| a5 | | −3.67E−05 | 1.09E−03 | 1.55E−03 | 1.13E−03 |
| a6 | | | −2.27E−04 | −2.98E−04 | −6.83E−04 |
| a7 | | | | | 1.73E−06 |

Figures 8A, 8B, 8C:
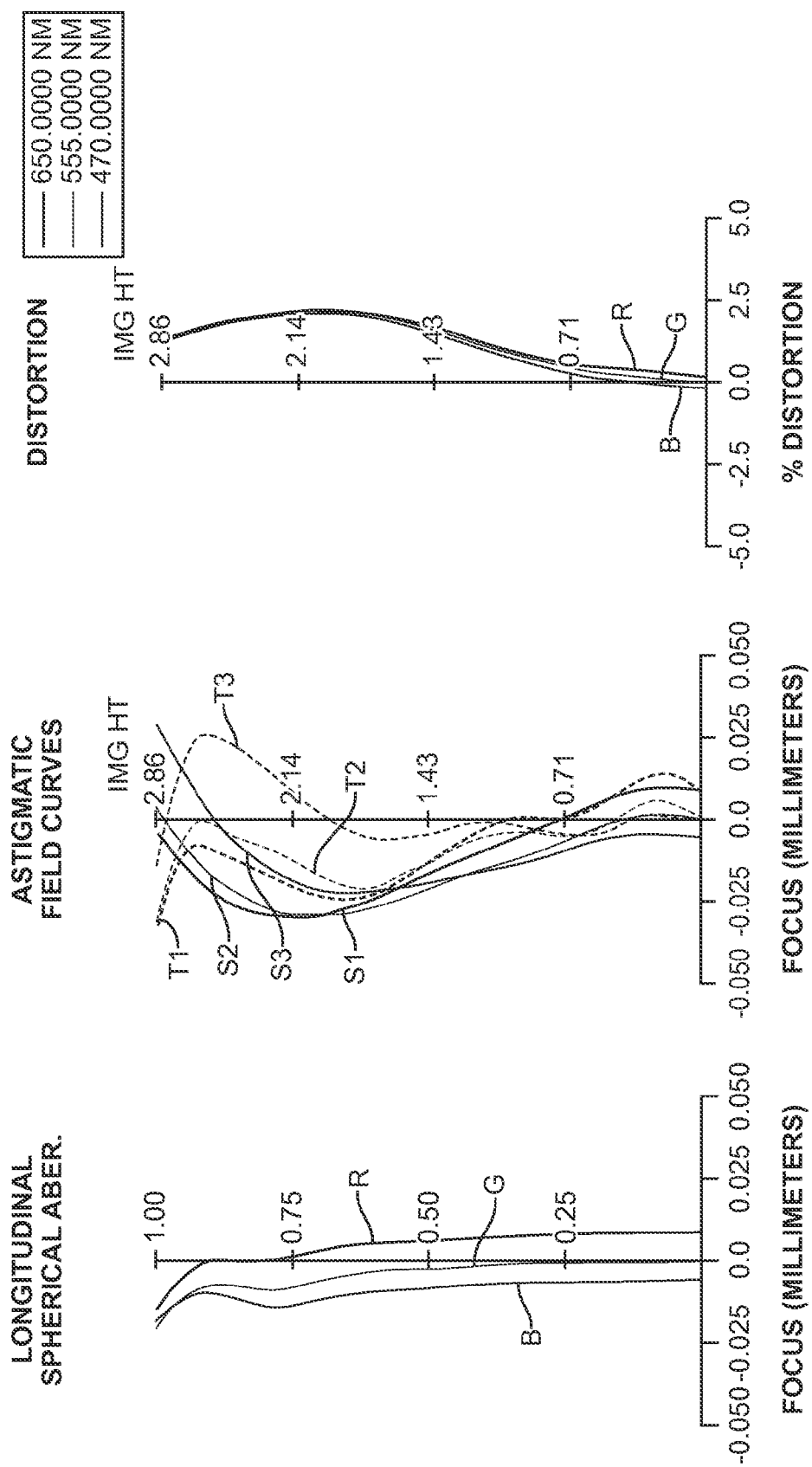
FIGS. 8A, 8B, and 8C show the respective longitudinal spherical aberration, sagittal and tangential astigmatic aberration, and distortion of the second embodiment.

FIGS. 8A, 8B, and 8C show the respective longitudinal aberration, sagittal and tangential aberration, and distortion of the second embodiment. As shown in FIG. 8A, the longitudinal spherical aberration curves for the 470 nm (denoted as "G"), 555 nm (denoted as "B") and 650 nm (denoted as "R") wavelengths are within ±0.025 mm of the image point. The sagittal (denoted as "s1," "s2," "s3") and tangential (denoted as "t1," "t2," "t3") astigmatic aberration for the respective wavelengths R, G, B are within ±0.025 mm (as shown in FIG. 8B). The distortion for the three wavelengths (denoted as "G," "B," and "R") is within ±2.5% as shown in FIG. 8C.

Figure 3:
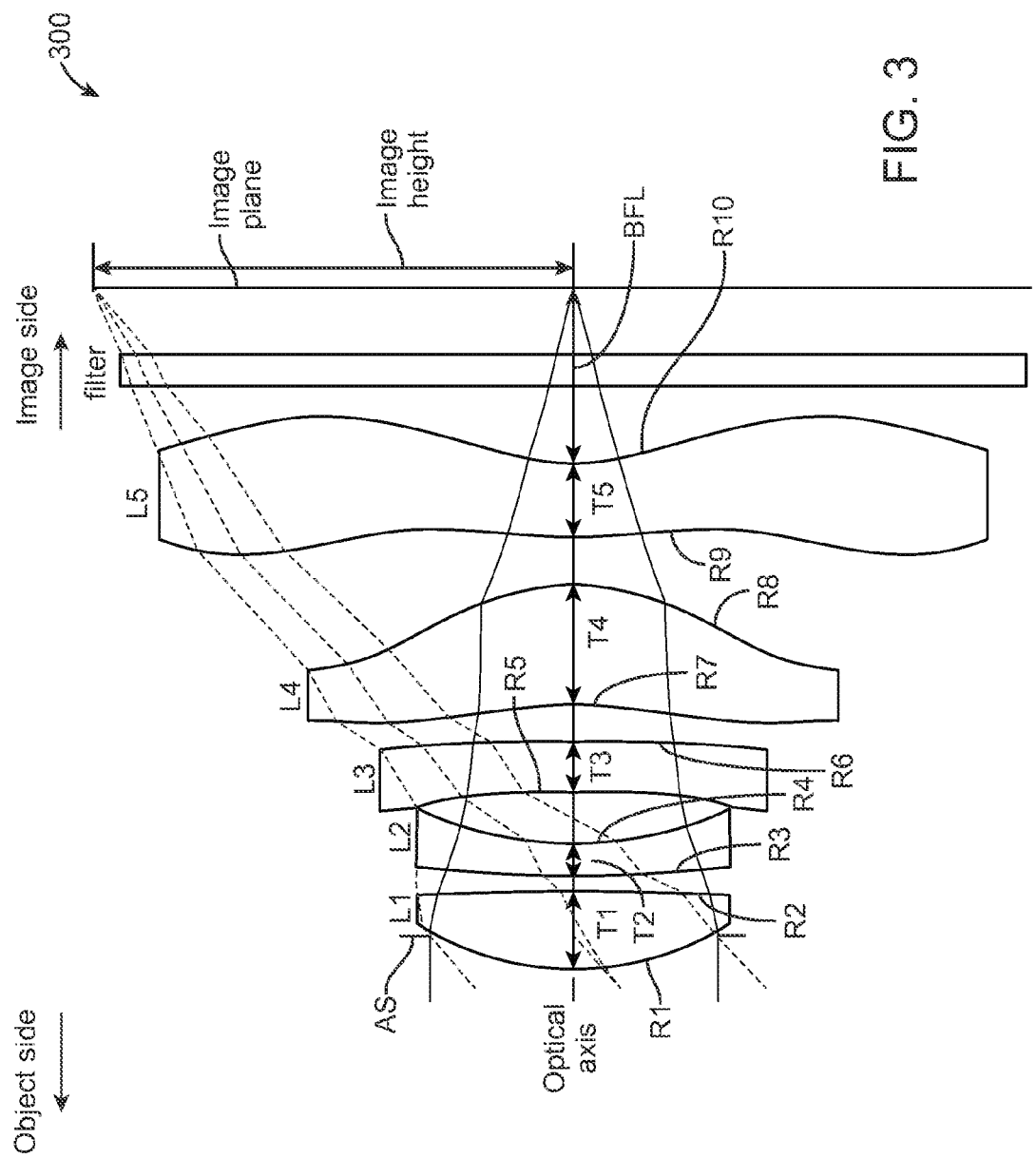
FIG. 3 is a schematic cross-section view of a five-element optical lens system according to a third embodiment of the present invention.

FIG. 3 is a schematic cross-section view of a five-element optical lens system 300 according to a third embodiment of the present invention. Optical lens system 300 has a similar structure as that of optical lens system 100 with the differences in the refractive index of the lens elements, the curvature radius, lens thickness, the air gap width between the lenses, aspheric coefficients, the focal length, and other relevant parameters. Specifically, optical lens system 300 differs from optical lens system 100 by having the third lens element with a concave image side surface in the vicinity of the optical axis and in a convex surface in the vicinity of the outer periphery.

Table 3A shows numeric lens data of optical lens system 300 according to the third embodiment of the present invention.

TABLE 3A

| Surface # | | Curvature Radius | Thickness | Refractive index | Abbe # | Material | Focal length |
|---|---|---|---|---|---|---|---|
| 1 | Object | Infinity | 600 | | | | |
| 2 | Ape. Stop | Infinity | −0.223 | | | | |
| 3 | Lens 1 | 1.557 | 0.528 | 1.546 | 56.114 | plastic | 2.687155 |
| 4 | | −22.318 | 0.100 | | | | |
| 5 | Lens 2 | 7.711 | 0.220 | 1.645 | 23.265 | plastic | −4.186384 |
| 6 | | 1.977 | 0.345 | | | | |
| 7 | Lens 3 | 9.718 | 0.344 | 1.645 | 23.265 | plastic | 28.099943 |
| 8 | | 20.676 | 0.256 | | | | |
| 9 | Lens 4 | −2.574 | 0.814 | 1.546 | 56.114 | plastic | 3.0906019 |
| 10 | | −1.133 | 0.333 | | | | |
| 11 | Lens 5 | 2.754 | 0.484 | 1.536 | 56.273 | plastic | −3.224197 |
| 12 | | 0.997 | 0.523 | | | | |
| 13 | IR-filter | Infinity | 0.210 | | | | |
| 14 | | Infinity | 0.476 | | | | |
| | Image plane | Infinity | | | | | |

Table 3B shows numeric values of the five aspheric lens elements of the third embodiment.

TABLE 3B

| Surface # | 3 | 4 | 5 | 6 | 7 |
|---|---|---|---|---|---|
| NRADIUS | 0.895715345 | 0.922183271 | 0.92360555 | 0.910809159 | 0.935636878 |
| K | −4.188E+00 | 0.000E+00 | 0.000E+00 | −7.533E+00 | 0.000E+00 |
| a0 | 7.226E−02 | 7.832E−03 | 5.976E−03 | 6.486E−02 | −1.269E−01 |
| a1 | −4.037E−03 | −1.014E−02 | −2.648E−03 | 6.006E−03 | 9.956E−05 |
| a2 | −5.960E−04 | −1.793E−03 | −8.049E−04 | 8.430E−04 | 2.029E−03 |
| a3 | −2.785E−04 | −2.664E−04 | 3.925E−04 | 4.193E−03 | 2.401E−04 |

TABLE 3B-continued

| | | | | |
|---|---|---|---|---|
| a4 | −6.258E−05 | | 1.176E−04 | 8.377E−05 |
| a5 | | | | |
| a6 | | | | |

| Surface # | 8 | 9 | 10 | 11 | 12 |
|---|---|---|---|---|---|
| NRADIUS | 1.153543654 | 1.388646875 | 1.573463499 | 2.246747921 | 2.461290101 |
| K | 0.000E+00 | −8.048E+00 | −7.882E−01 | −3.851E+01 | −5.165E+00 |
| a0 | −1.005E−01 | 1.617E−01 | 6.348E−01 | −5.879E−01 | −1.053E+00 |
| a1 | 1.059E−02 | 5.327E−03 | 3.555E−02 | 2.335E−01 | 1.562E−01 |
| a2 | 5.344E−03 | −7.709E−03 | −1.229E−02 | −4.424E−02 | −1.705E−02 |
| a3 | | −8.428E−05 | −6.830E−03 | 4.536E−03 | 1.716E−02 |
| a4 | | 6.767E−04 | 1.355E−03 | −2.368E−03 | −4.733E−03 |
| a5 | | −4.209E−05 | 9.524E−04 | 1.399E−03 | 6.401E−04 |
| a6 | | | −1.846E−04 | −2.982E−04 | −5.760E−04 |
| a7 | | | | | −1.672E−05 |

FIGS. 9A, 9B, and 9C show the respective longitudinal aberration, sagittal and tangential aberration, and distortion of the third embodiment. As shown in FIG. 9A, the longitudinal spherical aberration curves for the 470 nm ("G"), 555 nm ("B") and 650 nm ("R") wavelengths are within ±0.025 mm of the image point. The sagittal ("s1", "s2", "s3") and tangential ("t1", "t2", "t3") astigmatic aberration for the three wavelengths are within ±0.025 mm (as shown in FIG. 9B). The distortion for the three wavelengths ("G," "B," "R") is within ±2.0% as shown in FIG. 9C.

Figure 4:
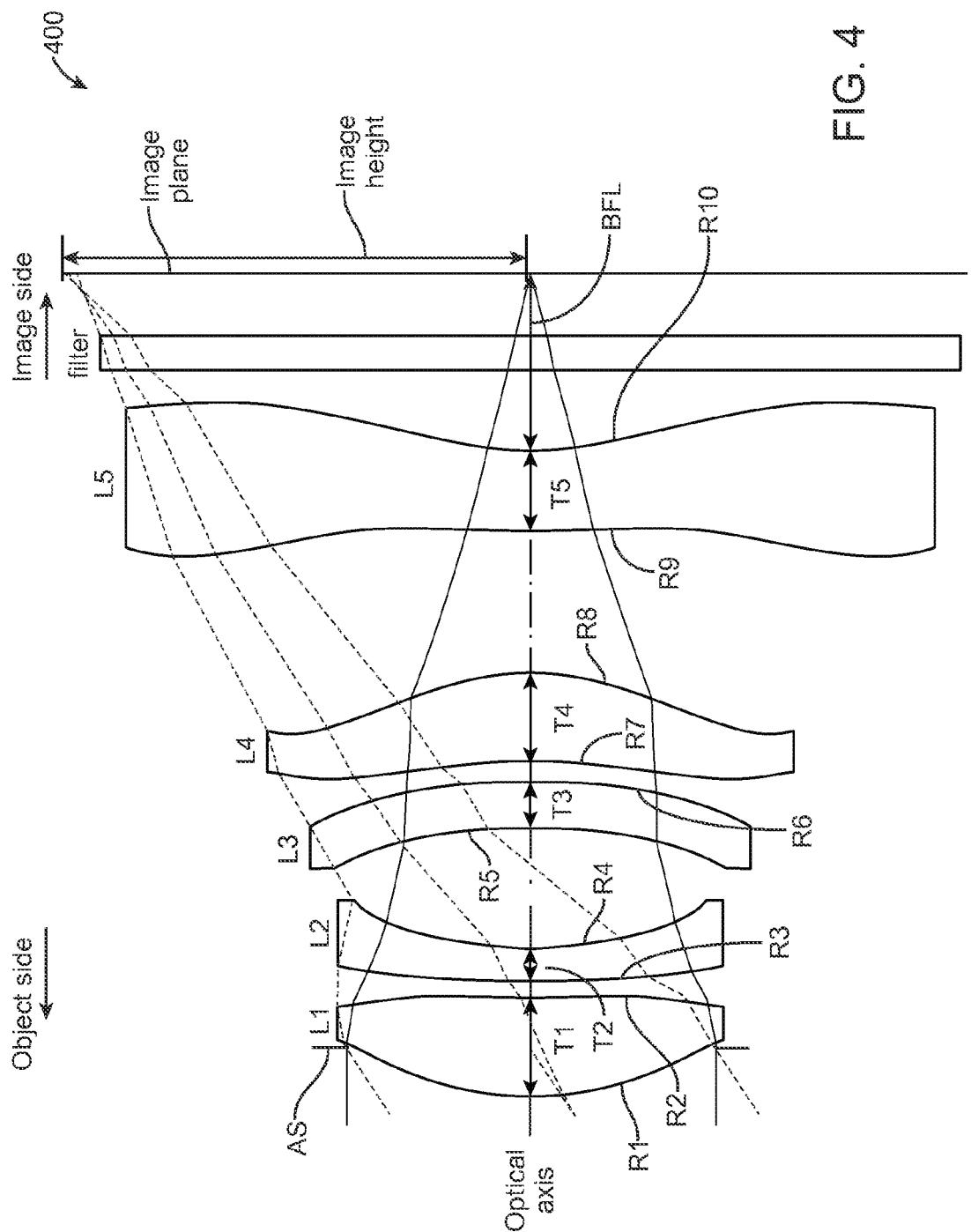
FIG. 4 is a schematic cross-section view of a five-element optical lens system according to a fourth embodiment of the present invention.

FIG. 4 is a schematic cross-section view of a five-element optical lens system 400 according to a fourth embodiment of the present invention. Optical lens system 400 has a similar structure as that of optical lens system 100 with the differences in the refractive index of the lens elements, the curvature radius, lens thickness, the air gap width between the lenses, aspheric coefficients, the focal length and other relevant parameters. For example, one of the differences between optical lens systems 400 and 100 is that the third lens element of optical lens system 300 has a concave object side surface, and the image side surface of the fourth lens element has a convex surface in the vicinity of the optical axis and a concave surface in the vicinity of the outer circumference.

Table 4A shows numeric lens data of optical lens system 400 according to the fourth embodiment of the present invention.

TABLE 4A

| Surface # | | Curvature Radius | Thickness | Refractive index | Abbe # | Material | Focal length |
|---|---|---|---|---|---|---|---|
| 1 | Object | Infinity | 600 | | | | |
| 2 | Ape. Stop | Infinity | −0.340 | | | | |
| 3 | Lens 1 | 1.822 | 0.693 | 1.546 | 56.114 | plastic | 3.220 |
| 4 | | −43.361 | 0.100 | | | | |
| 5 | Lens 2 | 9.174 | 0.220 | 1.645 | 23.265 | plastic | −5.451 |
| 6 | | 2.517 | 0.811 | | | | |
| 7 | Lens 3 | −14.102 | 0.312 | 1.645 | 23.265 | plastic | 165.693 |
| 8 | | −12.565 | 0.143 | | | | |
| 9 | Lens 4 | −2.741 | 0.591 | 1.546 | 56.114 | plastic | 5.262 |
| 10 | | −1.509 | 0.963 | | | | |
| 11 | Lens 5 | 5.755 | 0.538 | 1.536 | 56.273 | plastic | −4.375 |
| 12 | | 1.613 | 0.555 | | | | |
| 13 | IR-filter | Infinity | 0.223 | | | | |
| 14 | | Infinity | 0.380 | | | | |
| | Image plane | Infinity | | | | | |

Table 4B shows numeric values of the five aspheric lens elements of the fourth embodiment.

TABLE 4B

| Surface # | 3 | 4 | 5 | 6 | 7 |
|---|---|---|---|---|---|
| NRADIUS | 1.066230145 | 1.093583544 | 1.091552311 | 1.032347132 | 1.209500507 |
| K | −5.146E+00 | 0.000E+00 | 0.000E+00 | −8.860E+00 | 0.000E+00 |
| a0 | 9.881E−02 | −5.102E−03 | 2.545E−03 | 8.628E−02 | −2.535E−01 |
| a1 | −7.005E−03 | −1.474E−02 | −4.448E−03 | 5.137E−03 | 2.434E−02 |
| a2 | −7.983E−04 | −1.061E−03 | 1.901E−03 | 2.207E−03 | 9.237E−03 |
| a3 | −3.692E−04 | 2.027E−04 | 1.140E−03 | 6.718E−04 | 6.775E−04 |
| a4 | −9.748E−05 | | −6.668E−05 | −9.708E−07 | |
| a5 | | | | | |
| a6 | | | | | |

TABLE 4B-continued

| Surface # | 8 | 9 | 10 | 11 | 12 |
|---|---|---|---|---|---|
| NRADIUS | 1.343130582 | 1.49193297 | 1.574127924 | 2.246023233 | 2.490717185 |
| K | 0.000E+00 | −8.996E+00 | −7.167E−01 | −3.851E+01 | −4.667E+00 |
| a0 | −2.365E−01 | 1.891E−01 | 4.741E−01 | −5.673E−01 | −7.438E−01 |
| a1 | 1.930E−02 | 5.140E−03 | 3.350E−02 | 1.858E−01 | 1.356E−01 |
| a2 | 8.962E−03 | −3.221E−03 | −5.643E−03 | −3.017E−02 | −3.142E−02 |
| a3 |  | 3.100E−04 | −1.389E−03 | 4.992E−03 | 1.135E−02 |
| a4 |  | −3.024E−04 | 2.560E−04 | −2.574E−03 | −3.233E−03 |
| a5 |  | 1.220E−04 | −2.750E−04 | 7.687E−04 | 9.530E−04 |
| a6 |  |  | 1.213E−04 | −8.296E−05 | −3.212E−04 |
| a7 |  |  |  |  | 1.971E−05 |

Figures 10A, 10B, 10C:
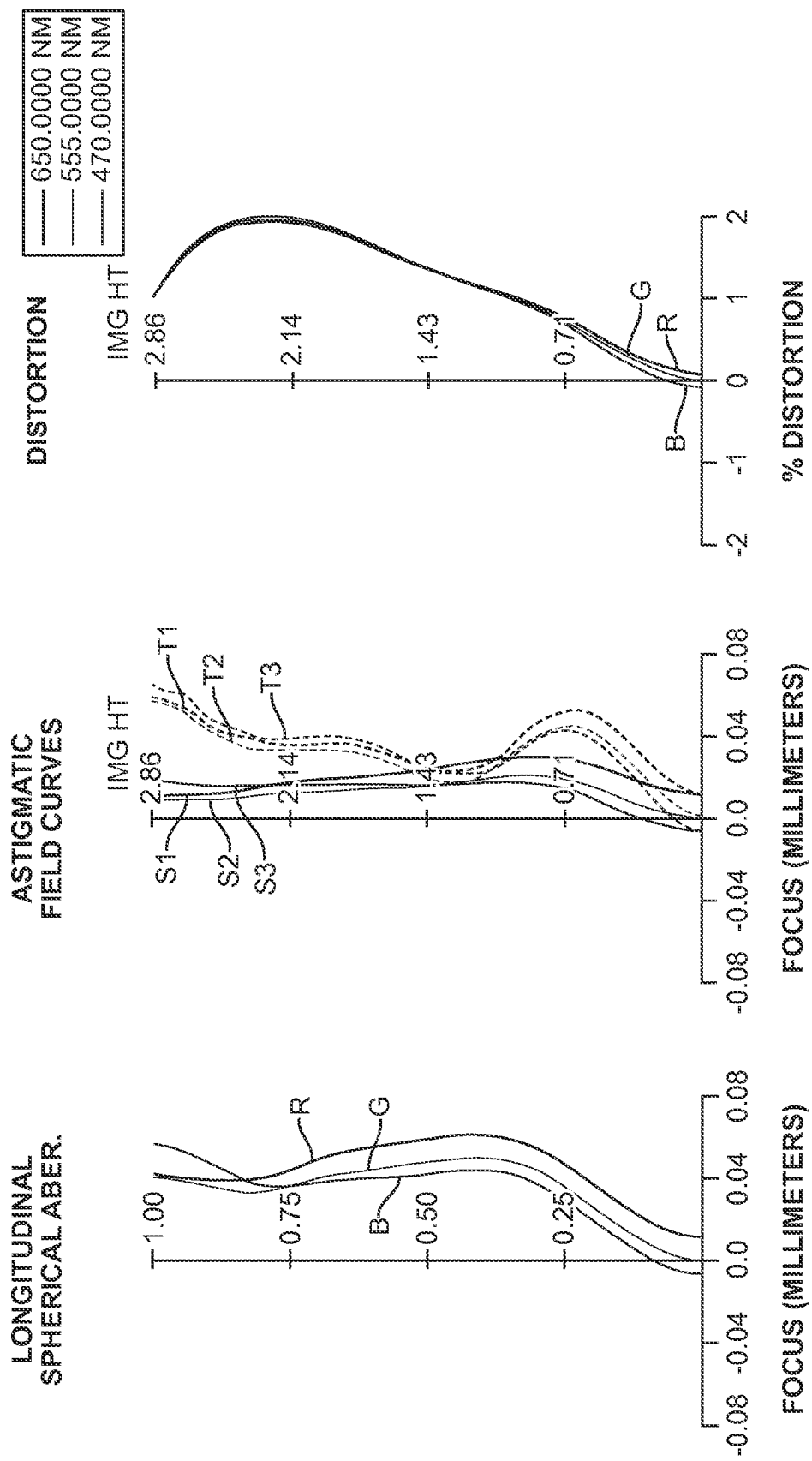
FIGS. 10A, 10B, and 10C show the respective longitudinal spherical aberration, sagittal and tangential astigmatic aberration, and distortion of the fourth embodiment.
Figure 13:
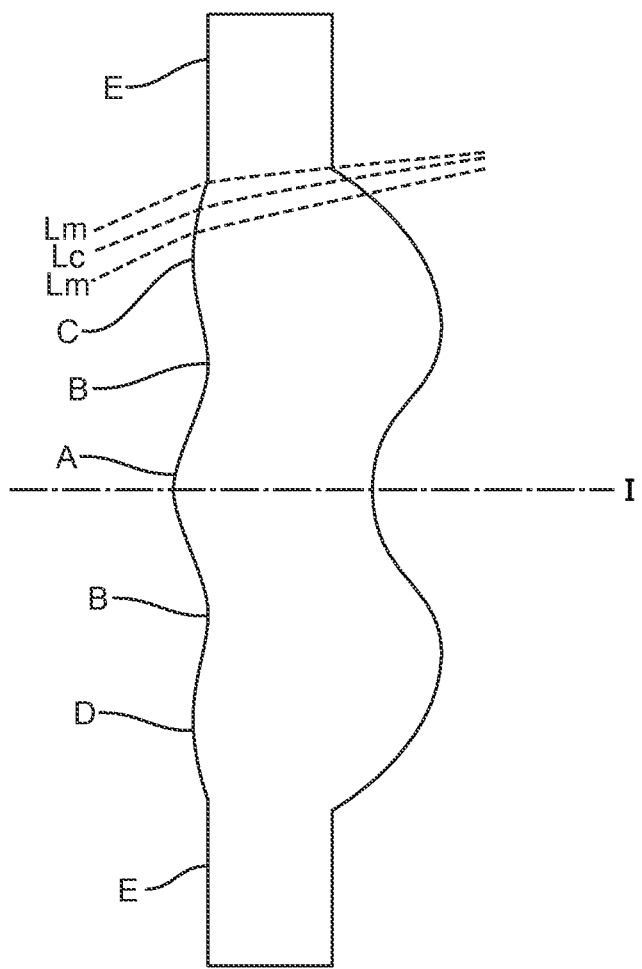
FIG. 13 is a cross section view of an exemplary lens element to explain some elms used in the present invention.

FIGS. 10A, 10B, and 10C show the respective longitudinal aberration, sagittal and tangential aberration, and distortion of the fourth embodiment. As shown in FIG. 10A, the longitudinal spherical aberration curves for the 470 nm ("G"), 555 nm ("B") and 650 nm ("R") wavelengths are within ±0.08 mm of the image point. The sagittal ("s1", "s2", "s3") and tangential ("t1", "t2", "t3") astigmatic aberration for the respective wavelengths R, G, B are within ±0.08 mm (as shown in FIG. 10B). The distortion for the three green, blue, and red wavelengths is within ±2.0% as shown in FIG. 10C.

Figure 5:
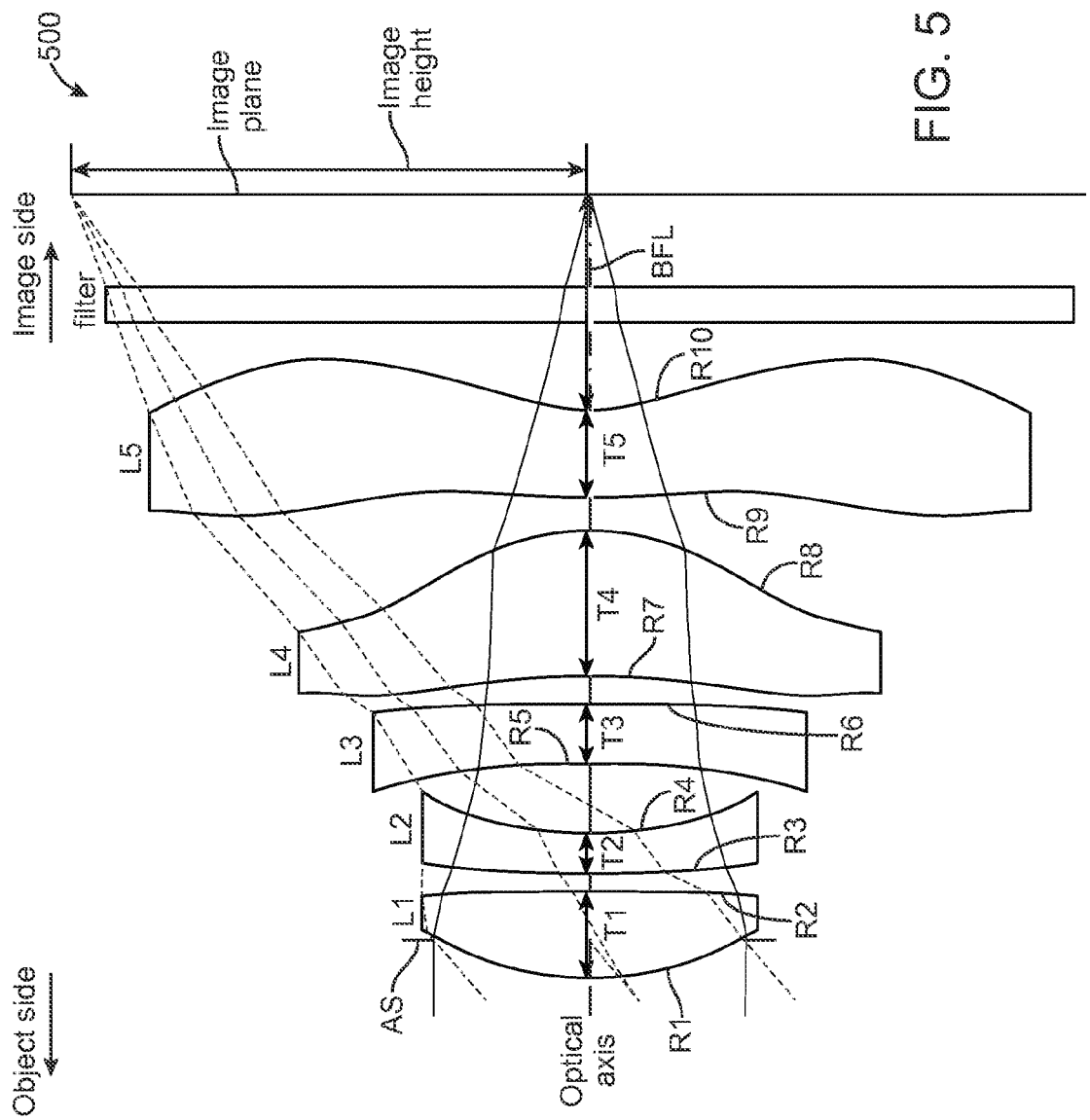
FIG. 5 is a schematic cross-section view of a five-element optical lens system according to a fifth embodiment of the present invention.

FIG. 5 is a schematic cross-section view of a five-element optical lens system 500 according to a fifth embodiment of the present invention. Optical lens system 500 has a similar structure as that of optical lens system 100 with the differences in the refractive index of the lens elements, the curvature radius, lens thickness, the air gap width between the lens elements, aspheric coefficients, the focal length and other relevant parameters. Optical lens system 500 differs from optical lens system 100 by having the third lens element with a concave surface in the vicinity of optical axis on the image side surface and a convex surface in the vicinity of the outer circumference on the image side surface.

Table 5A shows numeric lens data of optical lens system 500 according to the fifth embodiment of the present invention.

TABLE 5A

| Surface # |  | Curvature Radius | Thickness | Refractive index | Abbe # | Material | Focal length |
|---|---|---|---|---|---|---|---|
| 1 | Object | Infinity | 600 |  |  |  |  |
| 2 | Ape. Stop | Infinity | −0.228 |  |  |  |  |
| 3 | Lens 1 | 1.568 | 0.532 | 1.546 | 56.114 | plastic | 2.7106799 |
| 4 |  | −23.166 | 0.100 |  |  |  |  |
| 5 | Lens 2 | 7.681 | 0.248 | 1.645 | 23.265 | plastic | −4.541098 |
| 6 |  | 2.093 | 0.402 |  |  |  |  |
| 7 | Lens 3 | 11.400 | 0.368 | 1.645 | 23.265 | plastic | 228.2869 |
| 8 |  | 12.201 | 0.180 |  |  |  |  |
| 9 | Lens 4 | −2.690 | 0.871 | 1.546 | 56.114 | plastic | 2.9547707 |
| 10 |  | −1.124 | 0.195 |  |  |  |  |
| 11 | Lens 5 | 2.702 | 0.541 | 1.536 | 56.273 | plastic | −3.29766 |
| 12 |  | 0.994 | 0.523 |  |  |  |  |
| 13 | IR-filter | Infinity | 0.210 |  |  |  |  |
| 14 |  | Infinity | 0.573 |  |  |  |  |
|  | Image plane | Infinity |  |  |  |  |  |

Table 5B shows numeric values of the four aspheric lens elements of the fifth embodiment.

TABLE 5B

| Surface # | 3 | 4 | 5 | 6 | 7 |
|---|---|---|---|---|---|
| NRADIUS | 0.895715345 | 0.922183271 | 0.92360555 | 0.910809159 | 0.94648628 |
| K | −4.245E+00 | 0.000E+00 | 0.000E+00 | −7.169E+00 | 0.000E+00 |
| a0 | 7.057E−02 | 5.045E−03 | 7.185E−03 | 6.480E−02 | −1.252E−01 |
| a1 | −4.146E−03 | −9.573E−03 | −3.314E−03 | 4.593E−03 | −8.559E−04 |
| a2 | −5.696E−04 | −1.388E−03 | 7.430E−05 | 1.271E−03 | 1.428E−03 |
| a3 | −2.577E−04 | −2.355E−04 | 3.078E−04 | 3.854E−04 | 1.844E−04 |
| a4 | −5.534E−05 |  | 1.070E−04 | 9.059E−05 |  |
| a5 |  |  |  |  |  |
| a6 |  |  |  |  |  |

| Surface # | 8 | 9 | 10 | 11 | 12 |
|---|---|---|---|---|---|
| NRADIUS | 1.153543654 | 1.388646875 | 1.573463499 | 2.246747921 | 2.461290101 |
| K | 0.000E+00 | −8.444E+00 | −7.836E−01 | −3.851E+01 | −5.333E+00 |
| a0 | −1.056E−01 | 1.544E−01 | 6.294E−01 | −5.678E−01 | −1.160E+00 |

TABLE 5B-continued

| | | | | | |
|---|---|---|---|---|---|
| a1 | 8.510E−03 | 2.405E−03 | 3.300E−02 | 2.262E−01 | 1.624E−01 |
| a2 | 3.763E−03 | −7.319E−03 | −1.240E−02 | −4.913E−02 | −1.959E−02 |
| a3 | | −5.034E−04 | −6.888E−03 | 5.782E−03 | 1.715E−02 |
| a4 | | 8.373E−04 | 9.825E−04 | −2.569E−03 | −5.470E−03 |
| a5 | | −1.478E−04 | 9.298E−04 | 1.447E−03 | 9.766E−04 |
| a6 | | | −2.743E−04 | −4.781E−04 | −7.979E−04 |
| a7 | | | | | −1.348E−04 |

FIGS. 11A, 11B, and 11C show the respective longitudinal aberration, sagittal and tangential aberration, and distortion of the fifth embodiment. As shown in FIG. 11A, the longitudinal spherical aberration curves for the 470 nm ("G"), 555 nm ("B") and 650 nm ("R") wavelengths are within ±0.05 mm of the image point. The sagittal ("s1", "s2", "s3") and tangential ("t1", "t2", "t3") astigmatic aberration for the three red, green, and blue, wavelengths are within ±0.025 mm (as shown in FIG. 11B). The distortion for the three green, blue, and red wavelengths is within ±2.0% as shown in FIG. 11C.

Figure 6:
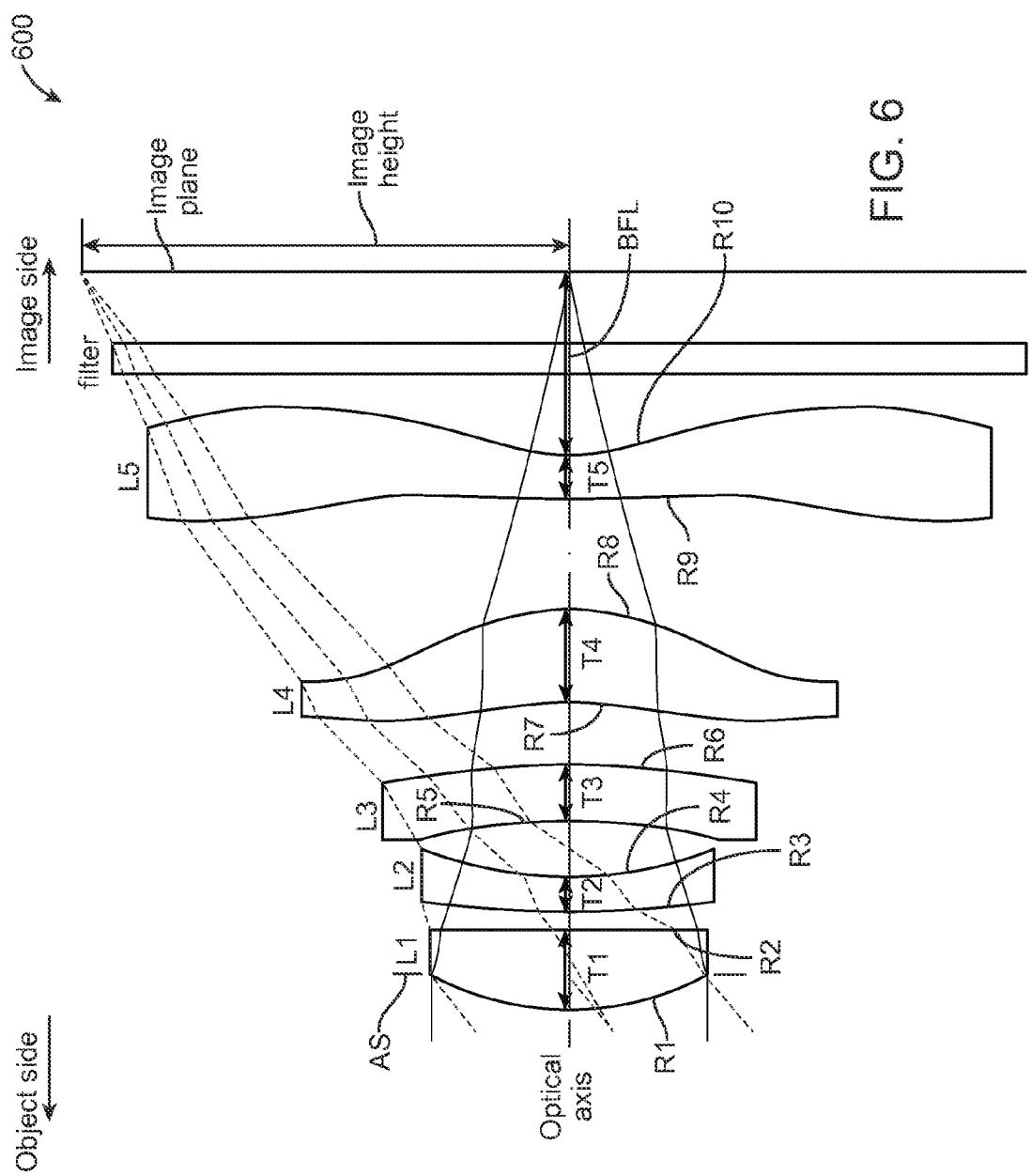
FIG. 6 is a schematic cross-section view of a five-element optical lens system according to a sixth embodiment of the present invention.

FIG. 6 is a schematic cross-section view of a five-element optical lens system 600 according to a sixth embodiment of the present invention. Optical lens system 600 has a similar structure as that of optical lens system 100 with the differences in the refractive index of the lens elements, the curvature radius, lens thickness, the air gap width between the lens elements, aspheric coefficients, the focal length and other relevant parameters. Optical lens system 600 differs from optical lens system 100 by having the third lens element with a negative power and a concave object side surface.

Table 6A shows numeric lens data of optical lens system 600 according to the sixth embodiment of the present invention.

TABLE 6A

| Surface # | | Curvature Radius | Thickness | Index | Abbe # | Material | Focal length |
|---|---|---|---|---|---|---|---|
| 1 | Object | Infinity | 600 | | | | |
| 2 | Aperture Stop | Infinity | −0.229 | | | | |
| 3 | Lens 1 | 1.585 | 0.519 | 1.546 | 56.114 | plastic | 2.748 |
| 4 | | −24.809 | 0.114 | | | | |
| 5 | Lens 2 | 8.044 | 0.220 | 1.645 | 23.265 | plastic | −4.224 |
| 6 | | 2.012 | 0.368 | | | | |
| 7 | Lens 3 | −19.814 | 0.378 | 1.645 | 23.265 | plastic | −191.689 |
| 8 | | −23.774 | 0.403 | | | | |
| 9 | Lens 4 | −3.047 | 0.618 | 1.546 | 56.114 | plastic | 3.364 |
| 10 | | −1.228 | 0.706 | | | | |
| 11 | Lens 5 | 2.510 | 0.300 | 1.536 | 56.273 | plastic | −3.337 |
| 12 | | 1.001 | 0.523 | | | | |
| 13 | IR-filter | Infinity | 0.210 | | | | |
| 14 | | Infinity | 0.461 | | | | |
| | Image plane | Infinity | | | | | |

Table 6B shows numeric values of the five aspheric lens elements of the sixth embodiment.

TABLE 6B

| Surface # | 3 | 4 | 5 | 6 | 7 |
|---|---|---|---|---|---|
| NRADIUS | 0.921337805 | 0.945985053 | 0.947484539 | 0.926207244 | 0.935138851 |
| K | −4.259E+00 | 0.000E+00 | 0.000E+00 | −7.862E+00 | 0.000E+00 |
| a0 | 7.827E−02 | 6.154E−03 | 5.963E−03 | 6.994E−02 | −1.210E−01 |
| a1 | −4.575E−03 | −1.080E−02 | −2.561E−03 | 5.567E−03 | 2.140E−03 |
| a2 | −8.014E−04 | −2.022E−03 | −4.156E−04 | 1.284E−03 | 1.801E−03 |
| a3 | −3.664E−04 | −3.342E−04 | 5.532E−04 | 5.104E−04 | 7.428E−05 |
| a4 | −8.935E−05 | | | 1.637E−04 | 1.479E−04 |
| a5 | | | | | |
| a6 | | | | | |

| Surface # | 8 | 9 | 10 | 11 | 12 |
|---|---|---|---|---|---|
| NRADIUS | 1.153002125 | 1.486385222 | 1.647146667 | 2.364279574 | 2.553945071 |
| K | 0.000E+00 | −5.801E+00 | −7.730E−01 | −3.851E+01 | −5.345E+00 |
| a0 | −1.181E−01 | 1.989E−01 | 7.589E−01 | −6.561E−01 | −1.017E+00 |
| a1 | 1.312E−02 | 3.163E−03 | 2.077E−02 | 2.644E−01 | 1.929E−01 |
| a2 | 5.429E−03 | −5.117E−03 | −1.872E−02 | −6.438E−02 | −3.381E−02 |
| a3 | | −2.182E−03 | −5.618E−03 | 1.379E−02 | 1.732E−02 |
| a4 | | 6.658E−04 | 3.453E−03 | −3.707E−03 | −4.547E−03 |
| a5 | | 2.400E−04 | 1.187E−03 | 7.213E−04 | 4.419E−04 |

TABLE 6B-continued

| | | | |
|---|---|---|---|
| a6 | 2.043E−05 | 5.317E−05 | −5.152E−04 |
| a7 | | | 9.529E−05 |

FIGS. 12A, 12B, and 12C show the respective longitudinal aberration, sagittal and tangential aberration, and distortion of the sixth embodiment. As shown in FIG. 12A, the longitudinal spherical aberration curves for the 470 nm ("G"), 555 nm ("B") and 650 nm ("R") wavelengths are within ±0.50 mm of the image point. The sagittal ("s1", "s2", "s3") and tangential ("t1", "t2", "t3")") astigmatic aberration for the three red, green, and blue, wavelengths are within ±0.05 mm (as shown in FIG. 12B). The distortion for the three green, blue, and red wavelengths is within ±2.0% as shown in FIG. 12C.

Each of the optical lens systems 100, 200, 300, 400, 500, and 600 according to the embodiments of the present invention has the following optical characteristics and advantages. According to embodiments of the present invention, each of the optical lens systems 100, 200, 300, 400, 500, and 600 includes an aperture stop, first, second, third, fourth, and fifth lens elements disposed in order from the object side to the image side. Each of the five lens elements having an object side surface and an image side surface. The surfaces of the lens elements are aspheric. The object side surface of the first lens element is convex in the vicinity of an optical axis. The image side surface of the second lens element concave in the vicinity of an outer circumference. The object side of the fourth lens element is convex in the vicinity of the outer circumference. The image side surface of the fifth lens element is concave in the vicinity of the optical axis and convex in the vicinity of the outer circumference. The first, second, third, fourth, and fifth lens elements have a refractive power. Their combination achieves excellent image quality.

The surface shapes of the lens elements, their thickness, the distance between them, the location of the aperture stop can effectively reduce the overall length of a lens system while enhancing the optical performance and the manufacturability. According to embodiments of the present invention, the following conditions are to be satisfied to achieve a compact and lightweight lens system with good optical performance: the ratio of AAG/AG34 is less than or equal to 16.00, where AG34 is the air gap between the third and fourth lens elements along the optical axis, and AAG is the total width of the four air gaps from the first to the fifth lens elements along the optical axis. The total air gaps AAG is designed to be small in relation to the air gap AG34 to meet the miniaturization requirement of the optical lens system. The air gap AG34 has to maintain a certain value to let light pass through from a relatively small diameter of the third lens element to the fourth lens element with a relatively larger diameter. Thus, reducing the air gap between the third and fourth lens elements may be limited so that the ratio between AAG and AG23 has an upper limit. For this reason, AAG/AG34 is set to be less or equal to 16.00. In a preferred embodiment, 1.5≤AAG/AG34≤16.0.

The ratio of AG34/T2 is to be equal to or greater than 0.65. Because the third and fourth lens elements has to have a certain air gap between them to let pass through the relative small third lens element to the relative large fourth element, a comprise is to reduce the thickness of the second lens element. Thus, the ratio AG34/T2 is set equal to or greater than 0.65. In a preferred embodiment, the ratio AG34/T2 is in a range of 0.65-2.5.

Considering the light trajectory through the lens elements and the difficulty of their manufacture, the reduction of the air gaps between the respective third and fourth and fifth lens elements is relatively more difficult than the thickness reduction of the second lens element, so that the ratio of (AG34+AG45)/T2 is greater than or equal to 1.50. In a preferred embodiment, the ratio is in the range of 1.5-5.5.

The thickness of the fourth and fifth lens elements is relatively greater than that of the second lens element so that the reduction of T4 and T5 is limited and the ratio (T4+T5)/T2 is greater than or equal to 4.0. In a preferred embodiment, the ratio is in the range of 4-6.

Likewise, the ratio (T4)/T2 is designed to be greater than or equal to 1.8. In a preferred embodiment, the ratio is in the range of 1.8-3.

When considering the light trajectory through the lens elements and the difficulty of their manufacture, the reduction of the air gaps between the fourth and fifth lens elements and the thickness of the fifth lens element is relatively more difficult than the thickness reduction of the second lens element, so that the ratio of (AG45+T5)/T2 is greater than or equal to 2.60. In a preferred embodiment, the ratio is in the range of 2.6-7. Similarly, the ratio of AG45/T2 is set to be is greater than or equal to 1.00. In a preferred embodiment, the ratio is in the range of 1-5.

EFL denotes the efficient focal length of the optical lens system. Reducing the EFL will efficiently reduce the length of the optical lens system. The reduction of EFL is relatively large as compared to the reduction of the air gap AG45 and the thickness of the fifth lens element. Thus, according to an embodiment, the ratio EFL/(AG45+T5) has an upper limit that is set to be less than or equal to 5.2. In a preferred embodiment, the ratio is between 3-5.2.

TL denotes the distance between the object side surface of the first lens element and the image side surface of the fifth lens element measured along the optical axis. Reduced TL will reduces the total length of the optical lens system. However, the light trajectory through the five lens elements and the manufacturing capacity may set an upper limit of 22.0 to the ratio (TL+T5)/AG45. In an embodiment, the ratio is between 10.0 and 22.0.

Reducing the EFL will efficiently reduce the length of the optical lens system. The reduction of EFL is relatively large as compared to the reduction of the air gap AG34 and the thickness of the fifth lens element. Thus, according to an embodiment, the ratio EFL/(AG34+T5) has an upper limit less than or equal to 6.8, preferably between 3 and 6.8.

The ratio (AG34+AG45)/(AG12+AG23) is to be equal to or greater than 1.20 to achieve good image quality and good optical performance. In an embodiment, the ratio is preferably equal to or greater than 1.20 and less than 2.5.

Table 6 summaries values relating to the six above described embodiments.

TABLE 6

| | 1ST | 2ND | 3RD | 4TH | 5TH | 6TH |
|---|---|---|---|---|---|---|
| T1 | 0.535 | 0.563 | 0.528 | 0.693 | 0.532 | 0.519 |
| AG12 | 0.122 | 0.050 | 0.100 | 0.100 | 0.100 | 0.114 |
| T2 | 0.220 | 0.240 | 0.220 | 0.220 | 0.248 | 0.220 |
| AG23 | 0.341 | 0.350 | 0.345 | 0.811 | 0.402 | 0.368 |

TABLE 6-continued

|  | 1ST | 2ND | 3RD | 4TH | 5TH | 6TH |
|---|---|---|---|---|---|---|
| T3 | 0.295 | 0.353 | 0.344 | 0.312 | 0.368 | 0.378 |
| AG34 | 0.450 | 0.236 | 0.256 | 0.143 | 0.180 | 0.403 |
| T4 | 0.641 | 0.795 | 0.814 | 0.591 | 0.871 | 0.618 |
| AG45 | 0.305 | 0.332 | 0.333 | 0.963 | 0.195 | 0.706 |
| T5 | 0.517 | 0.467 | 0.484 | 0.538 | 0.541 | 0.300 |
| AAG | 1.218 | 0.968 | 1.034 | 2.017 | 0.877 | 1.591 |
| TL | 3.426 | 3.386 | 3.424 | 4.371 | 3.437 | 3.626 |
| EFL | 3.703 | 3.530 | 3.581 | 4.630 | 3.661 | 3.947 |
| AAG/AG34 | 2.707 | 4.102 | 4.039 | 14.105 | 4.872 | 3.948 |
| AG34/T2 | 2.045 | 0.983 | 1.164 | 0.650 | 0.726 | 1.832 |
| AG45/T2 | 1.386 | 1.383 | 1.514 | 4.377 | 0.786 | 3.209 |
| T5/T2 | 2.350 | 1.946 | 2.200 | 2.445 | 2.181 | 1.364 |
| (AG34 + AG45)/(AG12 + AG23) | 1.631 | 1.420 | 1.324 | 1.214 | 0.747 | 2.301 |
| (AG34 + AG45)/T2 | 3.432 | 2.367 | 2.677 | 5.027 | 1.512 | 5.041 |
| (T4 + T5)/T2 | 5.264 | 5.258 | 5.900 | 5.132 | 5.694 | 4.173 |
| (AG45 + T5)/T2 | 3.736 | 3.329 | 3.714 | 6.823 | 2.968 | 4.573 |
| EFL/(AG34 + T5) | 3.829 | 5.021 | 4.839 | 6.799 | 5.078 | 5.615 |
| EFL/(AG45 + T5) | 4.505 | 4.418 | 4.383 | 3.085 | 4.974 | 3.923 |
| (TL + T5)/AG45 | 12.928 | 11.605 | 11.736 | 5.098 | 20.400 | 5.561 |

As can be seen from Table 6, the values of the respective embodiments are within the range of the numeric values of the given relations.

Figure 15A:
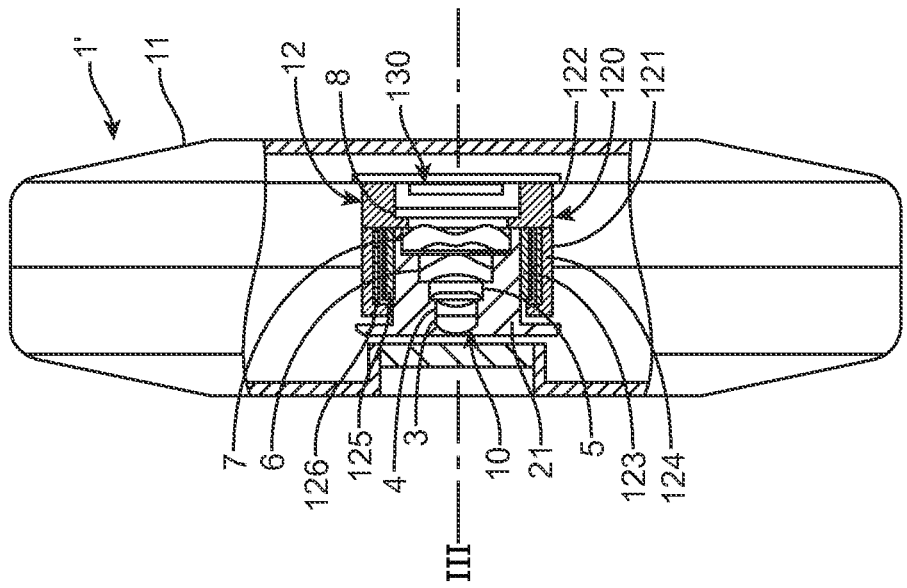
FIG. 15A is a schematic cross-sectional view of a portable electronic device with a built-in optical imaging module according to an embodiment of the present invention.

The present invention also provides a portable electronic device with a built-in optical imaging module that is compact and lightweight. FIG. 15A shows a portable electronic device 1 having a built-in optical image module according to an embodiment of the present invention. Portable electronic device 1 includes a case 11 and an optical imaging module 12 mounted in the case. The portable electronic device may be a mobile phone, a personal digital assistant (PDA), and the like. Optical imaging module 12 comprises an optical lens system 10, a lens barrel unit 21, a module housing unit 120 for mounting the lens barrel unit, and an imaging sensor 161 forming the image plane. In an embodiment, optical lens system 10 may include a five-element optical lens system such as one of the six embodiments described in above sections.

In an embodiment, module housing module 120 includes a lens rear base 121 and an image sensor rear base 122 that is disposed between lens rear base 121 and image sensor 130. Lens barrel 21 is disposed concentrically inside lens rear base 121 along the optical axis II.

Figure 15B:
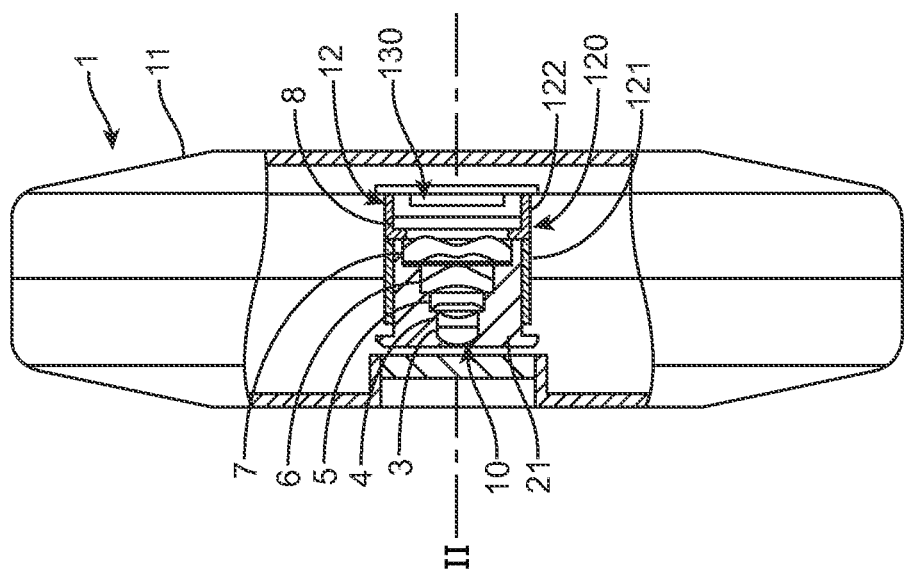
FIG. 15B is a schematic cross-sectional view of a portable electronic device with a built-in optical imaging module according to another embodiment of the present invention.

FIG. 15B shows a portable electronic device 1' according to another embodiment of the present invention. Portable electronic device 1' is similar to electronic portable device 1 so that the same reference numerals are used to identify the same parts. The primary difference is that module housing unit 120 in portable electronic device 1' includes a voice coil motor (VCM) driver module. Lens rear base 121 includes a first cylindrical body member 123 that is disposed concentrically with and lengthwise adjacent to the outer circumferential surface, and a second cylindrical body member 124 surrounding the outer circumferential surface of first body member 123. Lens rear base 121 further includes a coil 125 disposed between the outer circumferential surface of body member 123 and the inner circumferential surface of body member 124, and a magnetic component 126 disposed between the outer circumferential surface of coil 125 and the inner circumferential surface of body member 124.

First body member 123 moves lens barrel unit 21 and optical lens system 1 mounted on the lens barrel unit back and forth and lengthwise in the direction of the optical axis. Image sensor rear base 122 and second body member 124 are rigidly mounted together. In an embodiment, a filter 8 is disposed on image sensor rear base 122. Other components of portable electronic device 1' are similar to portable electronic device 1 and their description are not repeated herein for the sake of brevity.

Because the optical length of the imaging lens system 10 can be effectively shortened, so that portable electronic devices 1 and 1' can be made compact and lightweight while providing good image quality and optical performance. Thus, the present invention not only provides the economic benefits of reducing the amount of assembly materials, but also meeting the miniaturization and lightweight trends.

The present invention has broader applications that are not limited to portable devices. While the present invention has been described with respect to what is considered as preferred embodiments, it is to be understood that the invention is not limited to the disclosed embodiments. The invention is intended to cover various modifications and equivalent arrangements included within the scope of the appended claims.

What is claimed is:

1. An optical imaging lens having only five lens elements, the optical imaging lens comprising, in order from an object side to an image side, an aperture stop, first, second, third, fourth, and fifth lens elements, each of the five lens elements having an object side surface and an image side surface, wherein:

the object side surface of the first lens element is convex in the vicinity of an optical axis;

the image side surface of the second lens element is concave in the vicinity of an outer circumference;

the image side surface of the third lens element is convex in the vicinity of its outer circumference;

the object side surface of the fourth lens element is convex in the vicinity of the outer circumference;

the image side surface of the fifth lens element is concave in the vicinity of the optical axis and convex in the vicinity of the outer circumference, and the object side surface of the fifth lens has a convex portion in the vicinity of the optical axis; and the first, second, third, fourth, and fifth lens elements have a refractive power;

wherein the optical imaging lens does not include any lens element with refractive power other than said first, second, third, fourth and fifth lens elements, and wherein an air gap between the first and second lens elements along the optical axis is AG12, an air gap between the second and third lens elements along the optical axis is AG23, an air gap between the third and fourth lens elements along the optical axis is AG34, an air gap between the fourth and fifth lens elements along the optical axis is AG45, and they satisfy the relation:

$1.20 \le (AG34+AG45)/(AG12+AG23)$.

2. The optical imaging lens of claim 1, wherein the the image side surface of the first lens element is convex in the vicinity of the outer circumference.

3. The optical imaging lens of claim 2, wherein a sum of total air gaps between the first, second, third, fourth, and fifth lens elements along the optical axis is AAG, and they satisfy the relation:

$AAG/AG34 \le 16.00$.

4. The optical imaging lens of claim 3, wherein a thickness of the second lens element along the optical axis is T2, and it satisfies the relation:

$0.65 \le AG34/T2$.

5. The optical imaging lens of claim 4, further satisfying the relation:

$1.50 \leq (AG34+AG45)/T2$.

6. The optical imaging lens of claim 5, wherein a thickness of the fourth lens element along the optical axis is T4, a thickness of the fifth lens element along the optical axis is T5, and they satisfy the relation:

$4.00 \leq (T4+T5)/T2$.

7. The optical imaging lens of claim 6, wherein the thicknesses T2 and T5 of the respective second and fifth lens elements satisfy the relation:

$1.80 \leq T5/T2$.

8. The optical imaging lens of claim 5, wherein the object side surface of the fifth lens element is convex in the vicinity of the outer circumference.

9. The optical imaging lens of claim 3, wherein a thickness of the second lens element along the optical axis is T2, and it satisfies the relation:

$1.50 \leq (AG34+AG45)/T2$.

10. The optical imaging lens of claim 9, wherein a thickness of the fifth lens element along the optical axis is T5, and it satisfies the relation:

$2.60 \leq (AG45+T5)/T2$.

11. The optical imaging lens of claim 10, wherein a thickness of the fourth lens element along the optical axis is T4, and it satisfies the relation $4.90 \leq (T4+T5)/T2$.

12. The optical imaging lens of claim 2, wherein a thickness of the second lens element along the optical axis is T2, and it satisfies the relation:

$0.65 \leq AG34/T2$.

13. The optical imaging lens of claim 12, further satisfying the relation:

$1.00 \leq AG45/T2$.

14. The optical imaging lens of claim 13, wherein an effective focal length is EFL, a thickness of the fifth lens element is T5, and they satisfy the relation:

$EFL/(AG45+T5) \leq 5.20$.

15. The optical imaging lens of claim 14, wherein a total length from the object-side surface of the first lens element to an image side surface of the fifth element along the optical axis is TL, and they satisfy the relation:

$10.0 \leq (TL+T5)/AG45 < 22.0$.

16. The optical imaging lens of claim 2, wherein a thickness of the second lens element along the optical axis is T2, and it satisfies the relation:

$1.50 \leq (AG34+AG45)/T2$.

17. The optical imaging lens of claim 16, wherein a thickness of the fifth lens element along the optical axis is T5, an effective focal length is EFL, and they satisfy the relation:

$EFL/(AG34+T5) \leq 6.8$.

18. An electronic device with a digital camera, the electronic device comprising:
 a case;
 a module housing unit disposed within the case;
 a lens barrel mounted in the module housing unit; and
 an optical lens module assembled in the lens barrel, the optical lens module having only five lens elements comprising, in order from an object side to an image side, an aperture stop, first, second, third, fourth, and fifth lens elements, each of the five lens elements having an object side surface and an image side surface, wherein:
 the object side surface of the first lens element is convex in the vicinity of an optical axis;
 the image side surface of the second lens element is concave in the vicinity of an outer circumference;
 the image side surface of the third lens element is convex in the vicinity of the outer circumference;
 the object side surface of the fourth lens element is convex in the vicinity of the outer circumference;
 the image side surface of the fifth lens element is concave in the vicinity of the optical axis and convex in the vicinity of the outer circumference, and the object side surface of the fifth lens has a convex portion in the vicinity of the optical axis; and
 the first, second, third, fourth, and fifth lens elements have a refractive power;
 wherein the optical lens module does not include any lens element with refractive power other than said first, second, third, fourth and fifth lens elements, and
 wherein an air gap between the first and second lens elements along the optical axis is AG12, an air gap between the second and third lens elements along the optical axis is AG23, an air gap between the third and fourth lens elements along the optical axis is AG34, an air gap between the fourth and fifth lens elements along the optical axis is AG45, and they satisfy the relation:

$1.20 \leq (AG34+AG45)/(AG12+AG23)$.

19. The electronic device of claim 18, wherein the lens barrel is movable lengthwise in a direction of the optical axis.

* * * * *